(12) United States Patent
Caplin et al.

(10) Patent No.: US 8,016,240 B2
(45) Date of Patent: Sep. 13, 2011

(54) SATELLITES AND SATELLITE FLEET IMPLEMENTATION METHODS AND APPARATUS

(75) Inventors: Glenn N. Caplin, Manhattan Beach, CA (US); Harold A. Rosen, Santa Monica, CA (US); Harmon C. Fowler, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 676 days.

(21) Appl. No.: 11/693,645

(22) Filed: Mar. 29, 2007

(65) Prior Publication Data

US 2008/0237399 A1 Oct. 2, 2008

(51) Int. Cl.
  *B64G 1/10* (2006.01)
  *H04B 7/185* (2006.01)
  *H04B 7/195* (2006.01)

(52) U.S. Cl. .................... 244/158.5; 455/12.1; 455/13.2

(58) Field of Classification Search ............... 244/158.1, 244/158.4, 158.5, 158.8, 173.1–173.3, 164, 244/169; 701/13, 226; 455/12.1, 13.1, 427, 455/13.2, 63.4, 25, 431, 3.02, 3.03, 73, 517, 455/3.06; 725/68, 69, 71, 100, 64, 63, 78, 725/8; 370/316
See application file for complete search history.

(56) References Cited

U.S. PATENT DOCUMENTS

| | | | | |
|---|---|---|---|---|
| 3,907,266 A | * | 9/1975 | Sano et al. .................... 267/102 |
| 4,575,029 A | * | 3/1986 | Harwood et al. .......... 244/171.1 |
| 4,725,024 A | * | 2/1988 | Vorlicek ........................ 244/164 |
| 4,854,527 A | | 8/1989 | Draim |
| 4,911,385 A | * | 3/1990 | Agrawal et al. ............... 244/165 |
| 5,020,746 A | * | 6/1991 | Anzel ............................ 244/169 |
| 5,199,672 A | * | 4/1993 | King et al. ................. 244/173.3 |
| 5,326,054 A | | 7/1994 | Turner |
| 5,553,816 A | | 9/1996 | Perrotta |
| 5,582,367 A | | 12/1996 | Castiel et al. |
| 5,602,838 A | | 2/1997 | Kartalopoulos |
| 5,646,847 A | * | 7/1997 | Ratan et al. ....................... 701/4 |
| 5,669,585 A | | 9/1997 | Castiel et al. |
| 5,681,011 A | | 10/1997 | Frazier |
| 5,788,187 A | | 8/1998 | Castiel et al. |
| 5,813,633 A | * | 9/1998 | Anzel ............................ 244/169 |
| 5,822,680 A | | 10/1998 | Stuart et al. |

(Continued)

OTHER PUBLICATIONS

USPTO notice of allowance for U.S. Appl. No. 11/615,774 dated Jun. 15, 2010.

*Primary Examiner* — Joshua J Michener
(74) *Attorney, Agent, or Firm* — Yee & Associates, P.C.; Kevin G. Fields

(57) ABSTRACT

A method for implementing a satellite fleet includes launching a group of satellites within a launch vehicle. In an embodiment, the satellites are structurally connected together through satellite outer load paths. After separation from the launch vehicle, nodal separation between the satellites is established by allowing one or more of the satellites to drift at one or more orbits having apogee altitudes below an operational orbit apogee altitude. A satellite is maintained in an ecliptic normal attitude during its operational life, in an embodiment. The satellite's orbit is efficiently maintained by a combination of axial, radial, and canted thrusters, in an embodiment. Satellite embodiments include a payload subsystem, a bus subsystem, an outer load path support structure, antenna assembly orientation mechanisms, an attitude control subsystem adapted to maintain the satellite in the ecliptic normal attitude, and an orbit maintenance/propulsion subsystem adapted to maintain the satellite's orbit.

19 Claims, 15 Drawing Sheets

U.S. PATENT DOCUMENTS

| | | | |
|---|---|---|---|
| 5,826,831 A * | 10/1998 | Anzel | 244/169 |
| 5,871,181 A | 2/1999 | Mass | |
| 5,896,558 A | 4/1999 | Wiedeman | |
| 5,931,417 A | 8/1999 | Castiel | |
| 6,019,318 A | 2/2000 | Cellier et al. | |
| 6,024,328 A * | 2/2000 | Ellison | 244/169 |
| 6,032,904 A * | 3/2000 | Hosick et al. | 244/169 |
| 6,102,335 A | 8/2000 | Castiel et al. | |
| 6,116,545 A * | 9/2000 | Salvatore et al. | 244/158.5 |
| 6,122,596 A | 9/2000 | Castiel | |
| 6,138,951 A * | 10/2000 | Budris et al. | 244/173.3 |
| 6,160,994 A | 12/2000 | Wiedeman | |
| 6,198,907 B1 * | 3/2001 | Torkington et al. | 455/12.1 |
| 6,223,019 B1 | 4/2001 | Briskman et al. | |
| 6,260,805 B1 * | 7/2001 | Yocum et al. | 244/164 |
| 6,325,332 B1 | 12/2001 | Cellier et al. | |
| 6,327,523 B2 | 12/2001 | Cellier | |
| 6,389,336 B2 | 5/2002 | Cellier | |
| 6,457,678 B1 | 10/2002 | Draim | |
| 6,511,020 B2 | 1/2003 | Higgins | |
| 6,564,053 B1 | 5/2003 | Briskman et al. | |
| 6,597,989 B2 | 7/2003 | Castiel | |
| 6,695,259 B1 | 2/2004 | Maeda et al. | |
| 6,701,126 B1 | 3/2004 | Draim | |
| 6,714,521 B2 | 3/2004 | Draim | |
| 6,726,152 B2 | 4/2004 | Higgins | |
| 6,845,950 B1 * | 1/2005 | Goodzeit et al. | 244/158.6 |
| 6,851,651 B2 | 2/2005 | Goodzeit | |
| 6,866,231 B2 | 3/2005 | Higgins | |
| 7,059,571 B2 * | 6/2006 | Kellberg | 244/169 |
| 2003/0189136 A1 | 10/2003 | Maeda et al. | |
| 2003/0228867 A1 | 12/2003 | Castiel | |
| 2004/0211864 A1 | 10/2004 | Less et al. | |
| 2005/0068915 A1 | 3/2005 | Atad et al. | |
| 2005/0098686 A1 | 5/2005 | Goodzeit | |
| 2006/0016934 A1 | 1/2006 | Sharer et al. | |
| 2006/0105708 A1 | 5/2006 | Maeda et al. | |
| 2006/0271966 A1 | 11/2006 | Staal et al. | |
| 2007/0023579 A1 * | 2/2007 | Wang et al. | 244/158.6 |
| 2008/0155610 A1 | 6/2008 | Rosen | |
| 2008/0307466 A1 | 12/2008 | Wang | |
| 2009/0224105 A1 | 9/2009 | Caplin et al. | |

* cited by examiner

SATELLITES AND SATELLITE FLEET IMPLEMENTATION METHODS AND APPARATUS

TECHNICAL FIELD

Embodiments described herein generally relate to satellites and to methods and apparatus for implementing satellite fleets.

BACKGROUND

Satellite systems have been used extensively to provide a variety of satellite-based services and functions. For example, current satellite systems provide communications services, broadcast and multi-cast services, earth imaging, radar, weather system monitoring, and astronomical observations, among other things.

A satellite system may consist of a single satellite or a plurality of satellites (e.g., a "satellite fleet") whose functionality are combined in some manner. Satellites may travel in geostationary orbits (GSO) or non-geostationary orbits (NGSO), and are referred to as GSO satellites or NGSO satellites, respectively. A satellite of a single satellite system typically is a GSO satellite, so that the satellite may provide continuous service over a distinct coverage area on the surface of the earth. Satellite fleets may include GSO and/or NGSO satellites. In order to provide continuous coverage, the orbital planes of the satellites within an NGSO satellite fleet typically are separated by some nodal separation angle.

To deploy a satellite fleet, satellites are placed into orbit using launch vehicles. In some cases, a single satellite is carried into orbit by a single launch vehicle. Because launch vehicles and launch operations are expensive, implementing a satellite fleet using single-satellite launches may be uneconomical, in some cases. Accordingly, some satellite fleets have been implemented by launching multiple satellites within a single launch vehicle. In a multiple-satellite launch, the satellites are structurally connected together using a special adapter or dispenser. Although some economies are gained through multiple-satellite launches, the special adapters or dispensers add launch mass and cost. Additionally, once the satellites are released from the launch vehicle (e.g., the payload fairing), they operate in the same plane or at least some of the satellites perform booster rocket burn operations to establish appropriate nodal separation between the satellites' orbital planes. To have the fuel capacity to perform the booster rocket burn operations, satellite fuel tanks are made to accommodate the extra fuel, which also adds extra launch mass.

NGSO operation may have the benefit of improved coverage for higher latitudes. However, NGSO operation suffers from a wider range solar beta angles (i.e., the angle between a satellite's primary axis and the direction of the sun). Because it is desirable to orient a satellite's solar panels perpendicular to the direction of the sun while simultaneously pointing the satellite's downlink antenna toward the intended coverage area, NGSO satellites include relatively complex steering mechanism and multiple gimbals to achieve solar panel orientation and downlink antenna steering.

It is desirable to provide methods and apparatus for economically and reliably implementing a satellite fleet to provide satellite-based services. In addition, it is desirable to provide satellites capable of providing the satellite-based services, which have reduced mass and/or complexity when compared with traditional satellites. Other desirable features and characteristics of embodiments of the inventive subject matter will become apparent from the subsequent detailed description and the appended claims, taken in conjunction with the accompanying drawings and the foregoing technical field and background.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description. An example satellite fleet is discussed, below, which includes six NGSO satellites in Molniya orbits, which provide direct broadcast satellite (DBS) services. It is to be understood that the description of the example satellite fleet is not intended to limit the scope of the inventive subject matter to such a fleet. Instead, embodiments of the inventive subject matter may be used in GSO satellites, NGSO satellites, satellites traveling in orbits that are different from Molniya orbits, and/or satellite fleets having anywhere from two to numerous satellites, and/or satellites that provide other types of services or perform other types of functions. Accordingly, the scope of the inventive subject matter is intended to include a variety of satellite and satellite fleet embodiments.

Embodiments of the inventive subject matter include satellites and methods of implementing satellite fleets. Embodiments of the inventive subject matter may be implemented in any of a variety of types of satellites (e.g., GSO satellites and/or NGSO satellites) and in any of a variety of satellite fleets. An example satellite fleet is discussed in conjunction with FIGS. 1-4. In particular, an example satellite fleet may form a portion of a direct broadcast satellite (DBS) system. The plurality of satellites within the fleet may transmit (e.g., broadcast) television signals toward a target geographical area. In an embodiment, each satellite may transmit television signals within the C-band (e.g., within a frequency range between 3.7 and 4.2 GHz), although satellites may transmit signals within other bands, in other embodiments. The plurality of satellites are in Molniya orbits, in an embodiment, whose nodes are substantially equally separated around the earth. The satellites are phased in their orbit paths so that they track along a common ground track.

Figure 1:
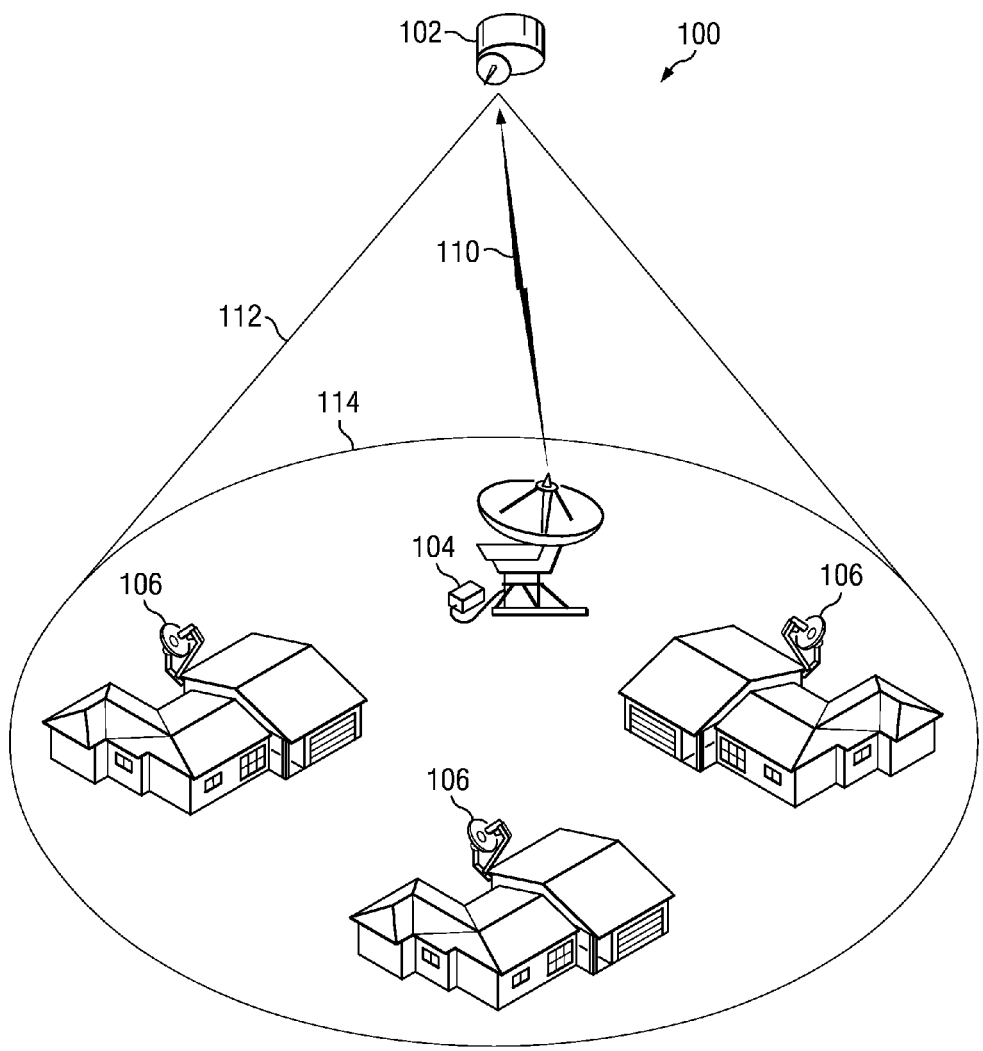
FIG. 1 illustrates a portion of a direct broadcast satellite system, in accordance with an example embodiment of the inventive subject matter.

FIG. 1 illustrates a portion of a DBS system 100, in accordance with an example embodiment of the inventive subject matter. DBS system 100 includes a plurality of satellites, such as satellite 102, within the user beams, at least one uplink hub 104, and a plurality of user equipment (UE) systems, where each UE system includes a UE antenna 106. Although FIG. 1 shows a single satellite 102, DBS system 100 may include a plurality of satellites. In an embodiment, DBS system 100 includes six satellites, although a system that implements an embodiment of the inventive subject matter may include more or fewer satellites. In addition, although one uplink hub 104 and three UE antennas 106 are illustrated, a system may include more or fewer (including zero) uplink hubs and/or UE antennas 106. Systems that implement embodiments of the inventive subject matter may include other types of equipment, as well.

Uplink hub 104 may include a control facility and one or more uplink antennas, in an embodiment. Uplink hub 104 is adapted to transmit uplink signals 110 toward satellite 102. In an embodiment in which DBS system includes a plurality of satellites, uplink hub 104 may transmit uplink signals 110 toward each satellite when the satellite is in view of uplink hub 104. Uplink signals may include, for example, satellite control information and/or content, among other things. In an embodiment, content may include uplink television signals, which may include multiple audio and video content streams.

Satellite 102 is adapted to receive uplink signals 110 from uplink hub 104. Satellite 102 further is adapted to transmit downlink signals toward the surface of the earth. Uplink and downlink signals may include content, such as television signals, for example. In an embodiment, satellite 102 transmits downlink signals in at least one directed beam 112. Although FIG. 1 illustrates a single beam 112, satellite 102 may transmit downlink signals in multiple directed beams, which may or may not overlap each other. Signals transmitted within a directed beam 112 may intersect the surface of the earth within a region 114. A region 114 may define a geographical area within which the signal strength and/or signal-to-noise ratio (SNR) of the transmitted downlink signals is considered to be above a threshold. A region 114 may be substantially circular, elliptical, or otherwise shaped, in various embodiments.

In various embodiments, satellite 102 may multi-cast and/or broadcast downlink signals toward a population of UE systems that are located proximate to a surface of the earth. In a particular embodiment, satellite 102 is adapted to receive uplink television signals and to broadcast downlink television signals, which UE antennas 106 and systems are adapted to receive. Satellite 102 transmits downlink television signals within a frequency range between 3.7 and 4.2 Gigahertz (GHz), or within the C-band, in an embodiment. In other embodiments, satellite 102 may transmit downlink signals within other bands and/or within other frequency ranges.

As will be described in more detail in conjunction with FIG. 2, embodiments of a system may include a plurality of satellites (e.g., a "satellite fleet"), which follow highly elliptical orbit (HEO) paths (e.g., Molniya orbit paths). In other embodiments, a system may include a plurality of satellites that follow other NGSO paths, and/or GSO paths.

As used herein, the term "Molniya orbit" means an orbit having an inclination of about 63.4 degrees, for which there is substantially no precession of the line of apsides. A Molniya orbital period of about twelve hours is synchronized with that of the earth's rotation, with two revolutions per day. Thus, two apogees with longitudes 180 degrees apart remain substantially fixed relative to the earth. In various embodiments, the orbit has an eccentricity within a range of about 0.71 to 0.75 (e.g., about 0.729 in a particular embodiment). In addition, in an embodiment, the orbit has an apogee altitude in a range of about 39,000 to 40,000 kilometers (km) (e.g., about 39,547 km in a particular embodiment), and a perigee altitude in a range of about 260 to 1325 km (e.g., about 820 km in a particular embodiment). The term "Molniya" orbit, as used herein, is not meant to limit the scope of the inventive subject matter to any other external definition of the term.

At an orbit inclination angle of 63.4, the absidial line (i.e., the line containing the semi-major axis of the ellipse) remains oriented in about the same direction in inertial space. Accordingly, this angle of inclination substantially prevents "absidial drift," or precession of the line of apsides around the orbit. In various embodiments, the orbits may have apogees in either the Northern or Southern hemispheres.

In an embodiment, an orbit period is about one-half of the sidereal day, in an embodiment, or about 12 hours. Accordingly, the orbit is subsynchronous with the rotation of the earth. Due to the subsynchronicity of the orbit, a ground track may include two zeniths in the Northern hemisphere (or two nadirs in the Southern hemisphere), each of which is associated with an apogee of the satellite's orbit. The ground track zeniths are substantially stationary, meaning that each one is located at a fixed latitude and longitude. Accordingly, each day, a satellite reaches a first apogee over an intersection between a ground track first latitude and a first longitude, and a second apogee over an intersection between a ground track second latitude and a second longitude.

In an embodiment, the satellites within the fleet have orbit parameters that cause the satellites to present themselves over substantially the same geographical areas during their orbit rotations. In other words, the satellites may follow orbit paths associated with a substantially fixed ground track. This ground track is referred to herein as a "common" ground track, because all satellites within the fleet are phased in their orbits so that they follow the same ground track. In another embodiment, the satellites within a fleet have orbit parameters that do not result in the satellites following orbit paths associated with a common ground track. In still another embodiment, the satellites within a fleet may include GSO satellites, which remain substantially fixed with respect to the surface of the earth.

Figure 2:
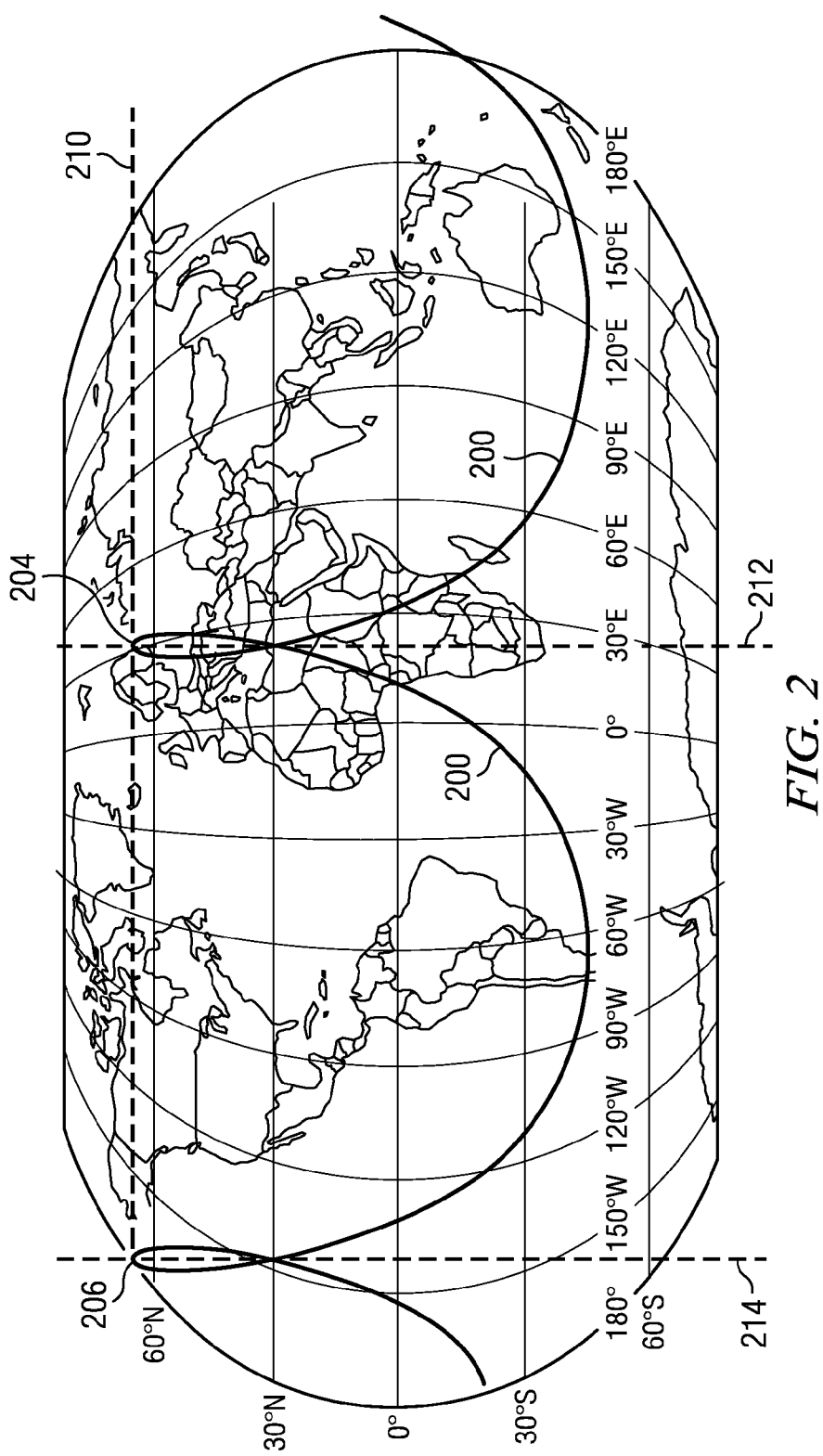
FIG. 2 illustrates a ground track, in accordance with an example embodiment.

FIG. 2 illustrates a ground track 200, in accordance with an example embodiment. Ground track 200 represents a substantially fixed path on the surface of the earth, over which each satellite of a satellite fleet travels during its orbit. As discussed above, ground track 200 may include two zeniths 204, 206, each of which corresponds to an apogee of a satellite's orbit. In an embodiment, each zenith 204, 206 is located at a fixed latitude 210 and a fixed longitude 212, 214. In an embodiment, latitude 210 is about 63.4 degrees North latitude for both zeniths 204, 206. A first zenith 204 of ground track 200 is located at a first longitude 212 (e.g., a longitude bisecting Europe or a longitude of about 10 degrees east being preferred in an example embodiment). A second longitude 214 may correspond to a second zenith 206 that is about 180 degrees separated from the first longitude 212, in an embodiment. Although the example embodiment of FIG. 2 describes preferred longitudes, any of a wide range of longitudes may be chosen in which the communications service is supported.

Figure 3:
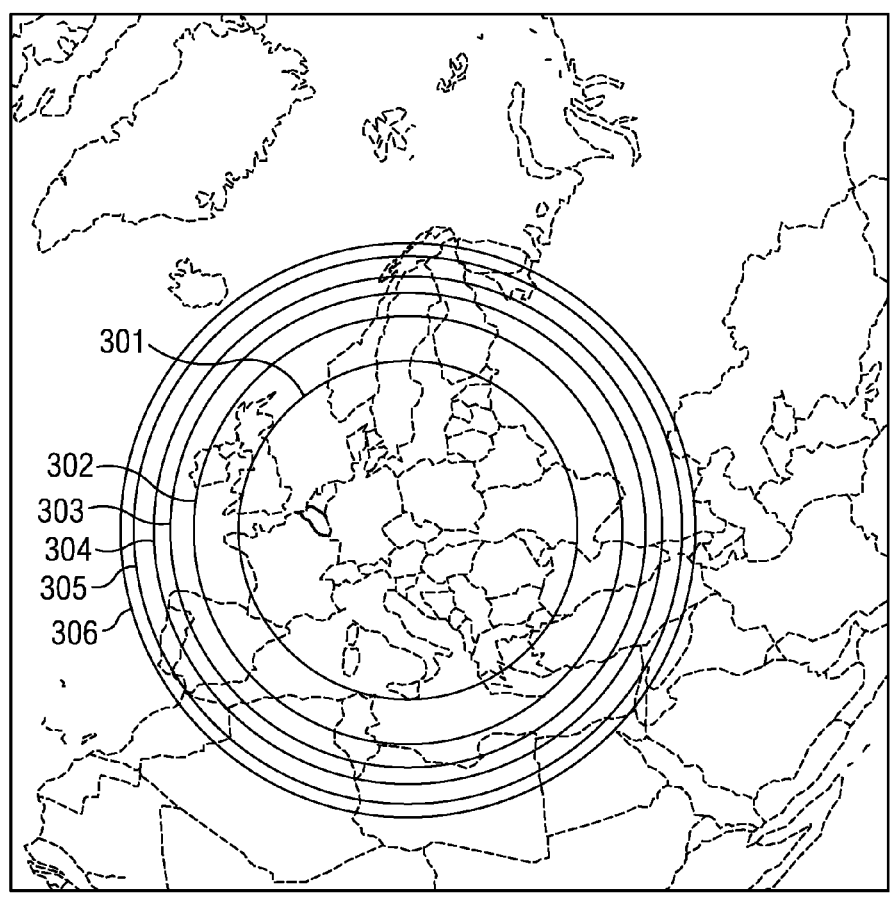
FIG. 3 illustrates a coverage area, in accordance with an example embodiment.

A coverage area may correspond to a geographic area on the surface of the earth within which satellite services are provided. FIG. 3 illustrates a coverage area, in accordance with an example embodiment. A coverage area may be represented by one or more contours. For example, FIG. 3 illustrates six contours 301, 302, 303, 304, 305, 306. Each contour may correspond to a predefined signal power and/or signal-to-noise ratio, where a signal-to-noise ratio at an inner contour (e.g., contour 301) may be higher than a signal-to-noise ratio at an outer contour (e.g., contour 306). The flatness of the pattern may be affected by various antenna characteristics. For example, a satellite may include a shaped or distorted parabolic reflector (e.g., reflector 542, FIG. 5), which may project a downlink beam (e.g., beam 112, FIG. 1). Desirably, the gain is optimized over the desired coverage area. As will be described in more detail later, a satellite may additionally include one or more mechanisms for aiming the beam at the desired coverage area. The contours 301-306 of FIG. 3 illustrate the gain of the antenna for transmission, as viewed by a satellite.

Within a coverage area, a DBS system may provide a downlink capacity within a range of about 800-900 Megabits per second (Mbps), with a capacity of about 864 Mbps in a particular embodiment. This corresponds to 36 Mbps for each of 24 RF channels, in an embodiment. Each 36 Mbps channel may contain a plurality of ordinary and/or high-definition digitally compressed television signals (e.g., 18 ordinary and/or 7 high-definition digitally compressed television signals). When the system services two coverage areas (e.g., areas proximate to two apogees 204, 206, FIG. 2), the system may provide a total downlink capacity that is about twice the capacity of a single coverage area, or within a range of about 1.6 to 1.8 Gigabits per second (Gbps), with a total capacity of about 1.728 Gbps in a particular embodiment. A system may provide downlink capacities larger or smaller than the above given ranges, in other embodiments.

Figure 4:
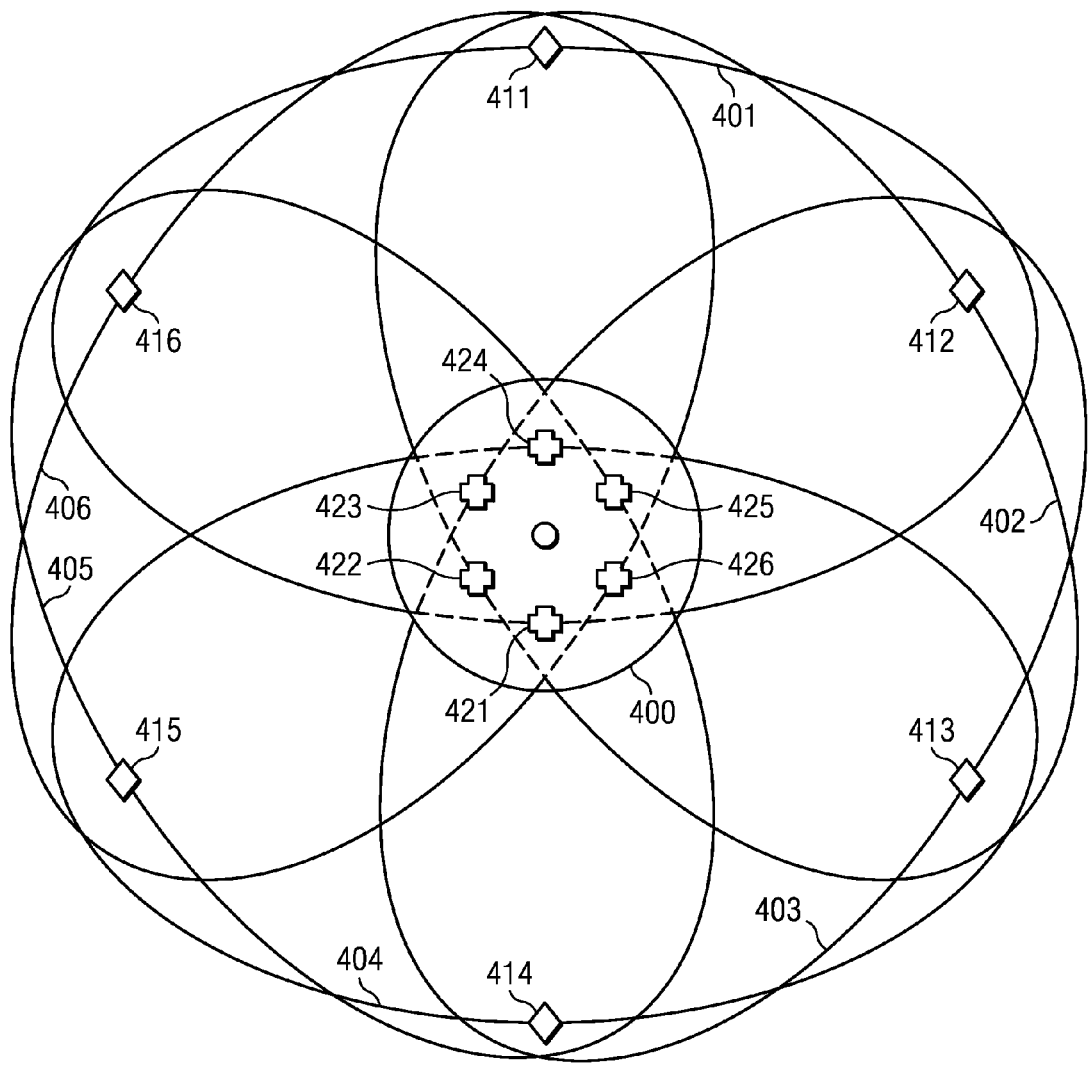
FIG. 4 illustrates a configuration of orbits for multiple satellites from the perspective of space, in accordance with an example embodiment.

FIG. 4 illustrates a configuration of orbits for multiple satellites from the perspective of space, in accordance with an example embodiment. Circle 400 represents the earth as seen from a point far above the North Pole. In a particular embodiment, a satellite fleet includes six satellites, and the ellipses in FIG. 4 represent orbit paths 401, 402, 403, 404, 405, 406 for the six satellites, where the orbit paths 401-406 have about a 60 degree nodal separation. The orbital planes for the satellites may be considered to have "widely separated nodes," where the term "widely separated nodes," as used herein, means a nodal separation greater than about 10 degrees. In various embodiments, satellites of a satellite fleet may have nodal separations in a range of about 10 degrees to about 180 degrees. Orbit paths 401-406 correspond to Molniya orbits, in an embodiment. Apogees 411, 412, 413, 414, 415, 416 and perigees 421, 422, 423, 424, 425, 426 are indicated with diamonds and crosses, respectively, for each orbit path 401-406. In other embodiments, a satellite fleet may include more or fewer than six satellites, the orbit paths may have something other than about a 60 degree nodal separation, and/or the orbit paths may correspond to other than Molniya orbits.

In order to provide satellite services in accordance with embodiments previously discussed, the system infrastructure first is established. This infrastructure includes a fleet of satellites, in an embodiment. In other embodiments, a system may include as few as one satellite. As will be described in detail below, satellites of various embodiments include various design features that may provide certain advantages in the areas of satellite fleet implementation and operations, among other things.

Figure 5:
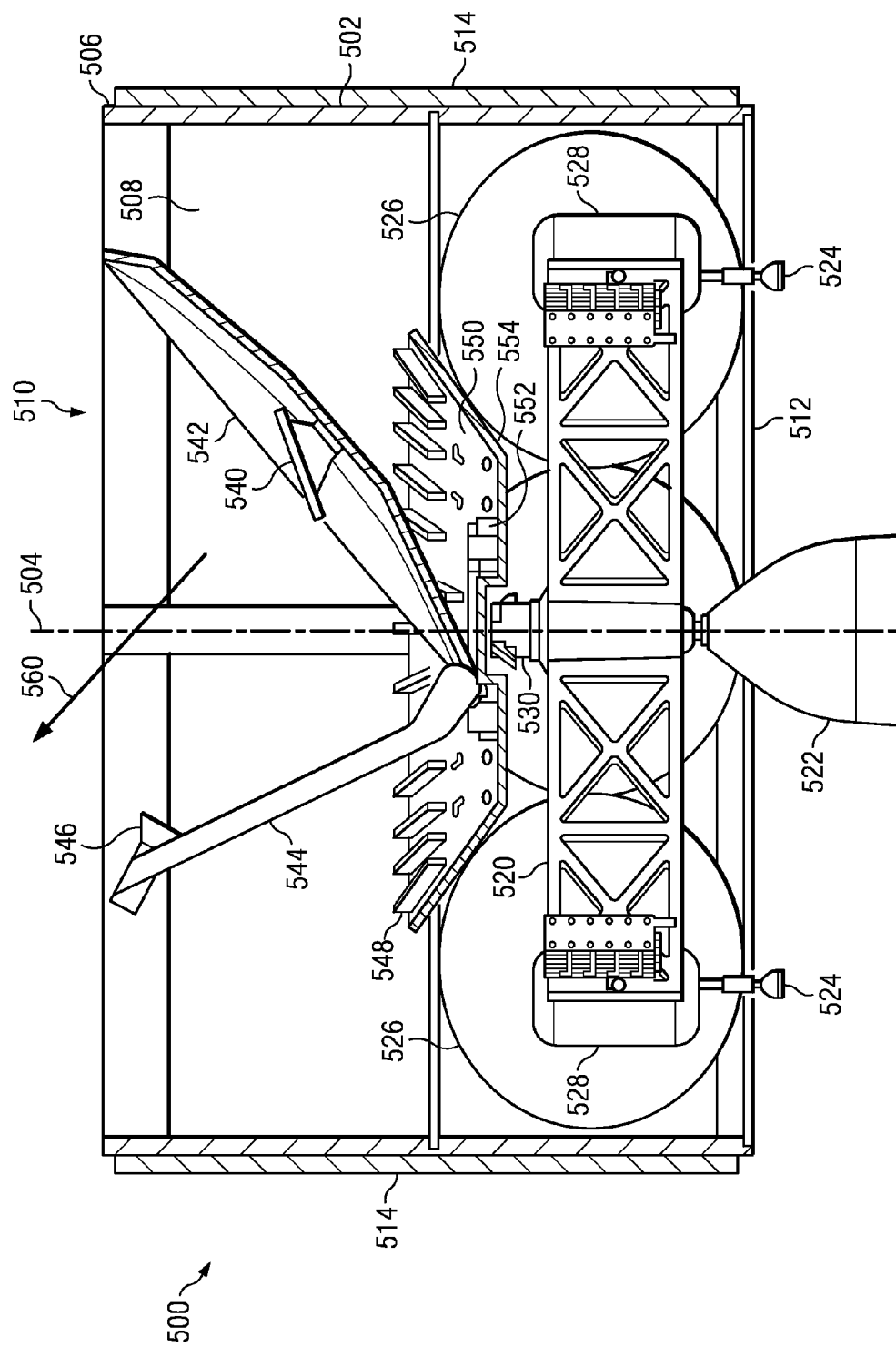
FIG. 5 illustrates a cross-sectional, side view of a satellite, in accordance with an example embodiment.

FIG. 5 illustrates a cross-sectional, side view of a satellite 500, in accordance with an example embodiment. Generally, satellite 500 includes an outer load path support structure 502, a solar energy collection subsystem, a bus subsystem, and a communications payload subsystem. Outer load path support structure 502 includes a rigid and substantially cylindrical structure that defines a primary axis 504 of satellite 500. The term "substantially cylindrical" means, in various embodiments, that outer load path support structure may have a substantially circular cross-section, or a cross-section having a different geometric shape that enables the outer load path support structure to substantially surround the bus subsystem and the communications payload subsystem.

In an embodiment, the attitude of satellite 500 is maintained so that primary axis 504 remains substantially perpendicular to the ecliptic plane (i.e., the geometric plane containing the mean orbit of the earth around the Sun). This attitude is referred to herein as an ecliptic normal attitude. Maintenance of a satellite in an ecliptic normal attitude may provide several advantages over traditional systems, which typically maintain their satellites in an orbit normal attitude (i.e., an attitude with a primary axis perpendicular to the satellite's orbit plane), an equatorial normal attitude (i.e., an attitude with a primary axis parallel to the equatorial plane) or in a sun nadir steered configuration.

As will be described in more detail later, outer load path support structure 502 is adapted to provide structural support for stacking multiple satellites in the payload fairing (e.g., payload fairing 1304, FIG. 13) of a booster rocket. In an embodiment, outer load path support structure 502 has a diameter (or width) in a range of about 2 m to about 5 m, with a diameter of about 3.5 m in a particular embodiment. Outer load path support structure 502 includes structural members (not illustrated) to define its shape, an exterior surface 506, an interior cavity 508, and an earth opening 510, in an embodiment. The exterior surface 506 may be substantially solid, or may include apertures. The earth opening 510 exposes a reflector 542 of the communications payload subsystem, and during operations, the earth opening 510 is directed toward the ecliptic while the exposed antenna is pointed towards earth. Outer load path support structure 502 also may have a space-oriented opening at an opposite end from earth opening 510, in an embodiment. In an alternate embodiment, satellite 500 may include an end cap structure 512 at the opposite end.

The solar energy collection subsystem includes one or more solar cell assemblies 514, which convert solar energy into electrical energy. In addition, the solar energy collection subsystem includes at least one battery (not illustrated) that receives and stores the electrical energy produced by solar cell assemblies 514. This energy is consumed, during operations, by various elements of satellite 500. In an embodiment, solar cell assemblies 514 may generate a substantial amount of power (e.g., about 2 kilowatts) for consumption by the satellite elements.

In an embodiment, solar panels of the solar cell assemblies 514 are attached to and/or define a portion of the exterior surface 506 of outer load path support structure 502. Because the primary axis 504 of satellite 500 is maintained substantially perpendicular to the ecliptic plane, in an embodiment, the sun impinges directly on exterior surface 506 throughout the satellite's entire orbit, except when the satellite is in the shadow of the earth or moon. Additionally, the interior cavity 508 is minimally exposed to the sun throughout the satellite's orbit. Accordingly, within the interior cavity 508 of outer load path support structure 502, significant thermal variations due to solar heating are not likely to occur. A satellite design, in accordance with an embodiment, may result in a substantially consistent thermal load within the interior cavity 508 of the satellite, when compared with satellites that maintain orbit normal, equatorial normal or sun nadir steered attitudes. In other words, maintenance of satellite 500 in an ecliptic normal attitude may result in a thermal boundary that is approximately constant throughout each orbit and throughout the operational life of satellite 500. This may enable a simplified thermal load control subsystem to be implemented on-board satellite 500, when compared with traditional satellites that experience widely varying thermal loads. In addition, traditional satellites include various mechanisms (e.g., gimbals) designed to dynamically adjust the orientation of the solar panels, with respect to the satellite body, in order to keep the solar panels facing the sun. Traditional satellites also may orient the entire satellite body to prevent excess thermal load. Because solar panels of the solar cell assemblies 514 inherently face the sun at virtually all times during system operations, and the earth opening 510 and space-oriented opening (or end cap structure 512) of the satellite never have solar impingement, such mechanisms and body steering may be excluded according to embodiments of the inventive subject matter.

The bus subsystem is located substantially within interior cavity 508 generally toward end cap structure 512 (or a space-oriented opening), and is rigidly coupled to the outer load path support structure 502. The bus subsystem may include support structure 520, at least one booster rocket 522, one or more fuel tanks 526, and one or more pressurization tanks 528. Support structure 520 is fixed to outer load path support structure 502, and physically supports booster rocket 522, fuel tanks 526, and pressurization tanks 528. Booster rocket 522 may be operated to change the altitude of satellite 500 significantly. For example, booster rocket 522 may be operated to transition satellite 500 from a low altitude orbit into an operational orbit (e.g., a Molniya orbit), as will be described in more detail later. Booster rocket 522 may include, for example, a liquid propellant engine (LPE), such as a bi-propellant liquid rocket adapted to produce high specific impulses. Fuel tanks 526 are adapted to contain liquid propellant for use by booster rocket 522 and thrusters 524. Pressurization tanks 528 are adapted to maintain adequate pressure within fuel tanks 526.

In an embodiment, satellite 500 also includes a set of multiple thrusters 524 positioned at various locations around satellite 500. Thrusters 524 are adapted to provide moments and velocity for attitude adjustments, spin up and spin down, and to compensate for orbital perturbations. Thrusters 524 may be positioned at various positions on satellite 500 in order to provide these adjustments in a fuel-efficient manner, as will be described in detail later in conjunction with FIGS. 15-18. Although only two thrusters 524 are illustrated in FIG. 5, satellite 500 may include many thrusters, in other embodiments.

Satellite 500 may include a "spinning" bus, in an embodiment. In such an embodiment, the bus subsystem and outer load path support structure 502 spin around the primary axis 504, and the communications payload subsystem remains substantially stationary, with respect to the primary axis 504. In addition, adjustments are made to point the reflector 542 of the communications payload subsystem in the correct direction during operations. In another embodiment, a satellite may not include a spinning bus (e.g., a body or three axis stabilized satellite).

In an embodiment, the bus subsystem is coupled to the communications payload subsystem through a despin control mechanism 530, such as a Bearing and Power Transfer Assembly (BAPTA), which is adapted to allow the bus subsystem to spin around primary axis 504 at a rate wherein the communications payload subsystem appears substantially stationary, with respect to earth. In addition, despin control mechanism 530 is adapted to provide a conduit for power and signal transmission between the two subsystems. In other embodiments, a spinning bus may not be implemented, and the bus subsystem and communications payload subsystem may be fixed, relative to each other.

The communications payload subsystem is located substantially within interior cavity 508, and is exposed at earth opening 510. The communications payload subsystem may include one or more uplink antennas 540, a reflector 542, a feed horn support structure 544, a feed horn 546, and communications electronics 548, among other things. In addition, communications payload subsystem includes a platform 550, which physically supports reflector 542, feed horn support structure 544, feed horn 546, and communications electronics 548. In an embodiment, platform 550 includes an inner region 552 and an outer region 554. Inner region 552 includes a substantially flat and circular structure, and outer region 554 includes a substantially conical structure, which is bisected by inner region 552, in an embodiment.

Uplink antennas 540 are coupled to the periphery of reflector 542, in an embodiment, although they may be coupled to other parts of satellite 500, in other embodiments. Uplink antennas 540 receive uplink signals (e.g., signals 110, FIG. 1). In an embodiment, an uplink antenna 540 may include a planar array antenna, although other types of uplink antennas alternatively may be used. Each uplink antenna 540 may receive an uplink signal of a particular polarization, and may provide the received uplink signal to communications electronics 548. For example, an uplink signal may include a dual-polarized signal, and accordingly, two uplink antennas 540 may be used, where a first uplink antenna 540 receives a signal having a first polarization, and a second uplink antenna 540 receives the component of the uplink signal having a second polarization. In alternate embodiments, a single antenna may receive a dual-polarized signal, or the uplink signal may be singly-polarized, and satellite 500 may include as few as one uplink antenna 540, or the uplink antenna may be diplexed with reflector 542 such that only a single antenna is used for both receiving and transmitting.

In an embodiment, communications electronics 548 receive the uplink signals from uplink antennas 540, and produce downlink signals. Communications electronics 548 may include, for example, a plurality of low noise amplifiers, downconverters, input filters, traveling wave tube amplifiers (TWTAs), and output multiplexers, in an embodiment. Communications electronics 548 are mounted on platform 550, in an embodiment. For example, power amplifiers and TWTAs may be mounted on outer region 554, and multiplexers may be mounted on inner region 552, in an embodiment. The various communications electronics 548 elements may be mounted in other locations, in other embodiments.

In an embodiment, a downlink signal may include multiple channels of television content, which may be multiplexed, and/or which may be spaced apart over the available spectrum. For example, a downlink signal may include 24 channels, which may be spaced apart by about 40 MHz when transmitted within the C-band. The active bandwidth per channel may be less than the spacing to mitigate potential effects of interference. For example, the active bandwidth per channel may be about 36 MHz. In an embodiment, a modulation system may provide one bit per second per Hertz, so that each channel may carry 36 Mbps. In alternate embodiments, a downlink signal may include more or fewer channels, have larger or smaller channel spacings and/or active bandwidths per channel, and/or compression algorithms may enable multiple channels to be carried in each band (e.g., 18 television channels per band) as well as various alternate modulation and coding schemes. In still other embodiments, one or more channels may be used to carry other types of information.

The TWTAs are adapted to amplify the downlink signals prior to transmission. In an embodiment, the number of TWTAs is directly related to the number of downlink channels provided by satellite 500. For example, in an embodiment in which 24 channels are provided on the downlink, communications electronics 548 may include 24 active TWTAs, each of which produces an output signal within a distinct sub-band. In addition, communications electronics 548 may include one or more spare TWTAs, which may be activated during operations, for example, when an active TWTA malfunctions. The mutliplexers combine the signals produced by the TWTAs, and provide the multiplexed signals to one or more antenna ports (not illustrated). Each multiplexed signal may include multiple channels (e.g., 12 channels each).

Feed horn 546 receives the multiplexed signals via the antenna ports, and produces one or more polarized, downlink signals. For example, in a preferred embodiment, a first multiplexed signal may be polarized using a first circular polarization (e.g., a right hand circular polarization), and a second multiplexed signal may be polarized using a second polarization (e.g., a second polarization that is substantially orthogonal to the first polarization, such as a left hand circular polarization). In an alternate embodiments, only a single polarization may be implemented or different orthogonal polarizations may be employed. Feed horn 546 projects the downlink signals toward reflector 542, which reflects the downlink signals in a beam direction indicated generally by beam direction vector 560. Reflector 542 may include a parabolic reflector, for example, although other types of reflectors alternatively may be used. In an embodiment, reflector 542 includes a reflector having a shape that produces substantially circular coverage area contours (e.g., contours 301-306, FIG. 3). In other embodiments, reflector 542 includes a shaped (e.g., distorted) parabolic reflector, where the shape of the reflector produces irregularly shaped coverage area contours. Reflector 542, feed horn support structure 544, and feed horn 546 are substantially fixed in orientation, with respect to each other, and together form a antenna assembly.

The direction beam vector 560 is affected by the orientation of the antenna assembly (i.e., reflector 542, feed horn 546, and feed horn support structure 544) with respect to the primary axis 504. The significance of these various axes and the orientation of the antenna assembly are described in more detail in conjunction with FIG. 6.

Figure 6:
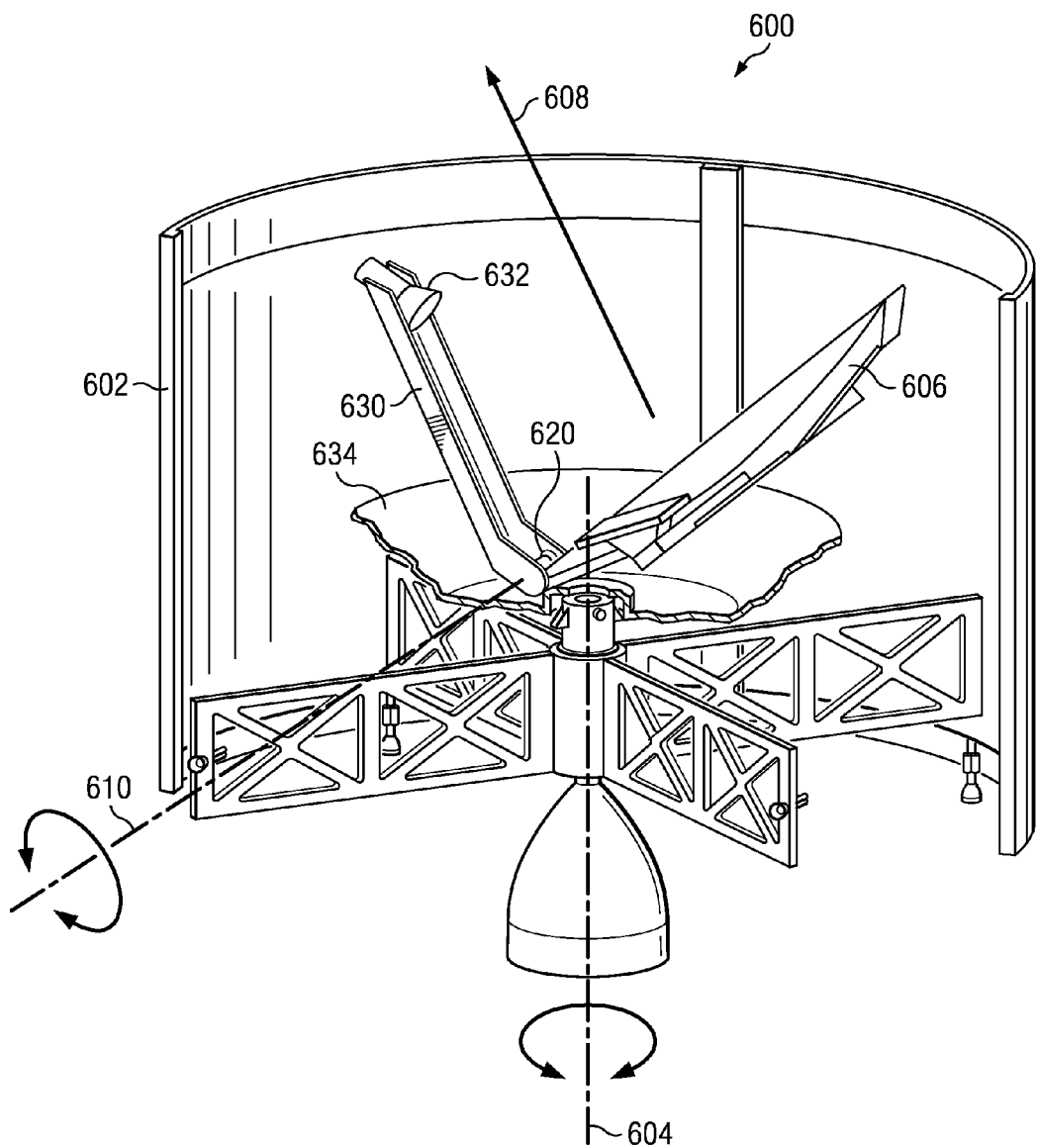
FIG. 6 illustrates a perspective, cut-away view of a satellite, in accordance with an example embodiment.

FIG. 6 illustrates a perspective, cut-away view of a satellite 600, in accordance with an example embodiment. As mentioned previously, outer load path support structure 602 defines a primary axis 604 of satellite 600, and reflector 606 reflects downlink signals in a direction indicated generally by beam direction vector 608. The general direction of beam direction vector 608 is affected by rotation of the antenna assembly about at least two control axes, which include the primary axis 604 and an elevation adjustment axis 610, which may be substantially orthogonal to the primary axis 604, in an embodiment. For a spinning bus embodiment, rotation about primary axis 604 (or "spin axis") is designated as an azimuth adjustment and is effected by a despin control mechanism (e.g., despin control mechanism 530, FIG. 5), and rotation about elevation adjustment axis 610 is designated as elevation adjustment and is effected by an elevation adjustment mechanism 620. In an embodiment, the despin control mechanism (e.g., despin control mechanism 530, FIG. 5) is adapted to provide a 360 degree range adjustment around the primary axis 604, and the elevation adjustment mechanism 620 is adapted to provide about a 90 degree range adjustment around the elevation adjustment axis 610. These two mechanisms are adjusted in accordance with the pointing requirements of a particular orbit plane, such that an antenna pattern which is a figure of rotation may be maintained over a coverage area. In other words, the at least two control axes may be used to orient the antenna assembly in a direction to support downlink signal transmission into a desired coverage.

Figure 7:
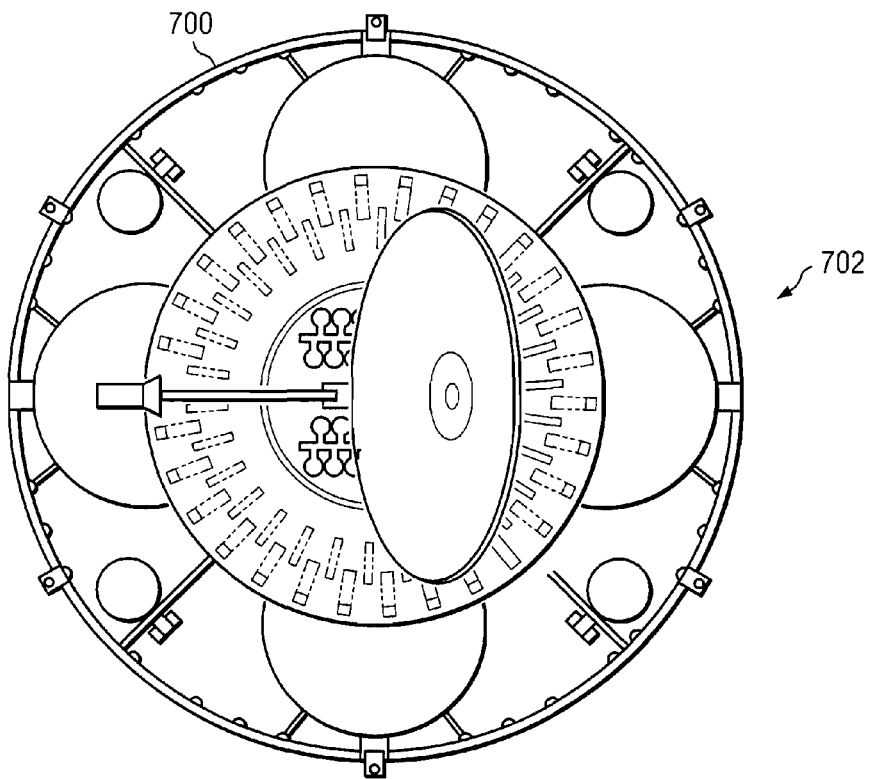
FIGS. 7-9 illustrate perspective top views and cut-away side views of a satellite with a antenna assembly in first, second, and third positions, in accordance with an example embodiment.
Figure 7:
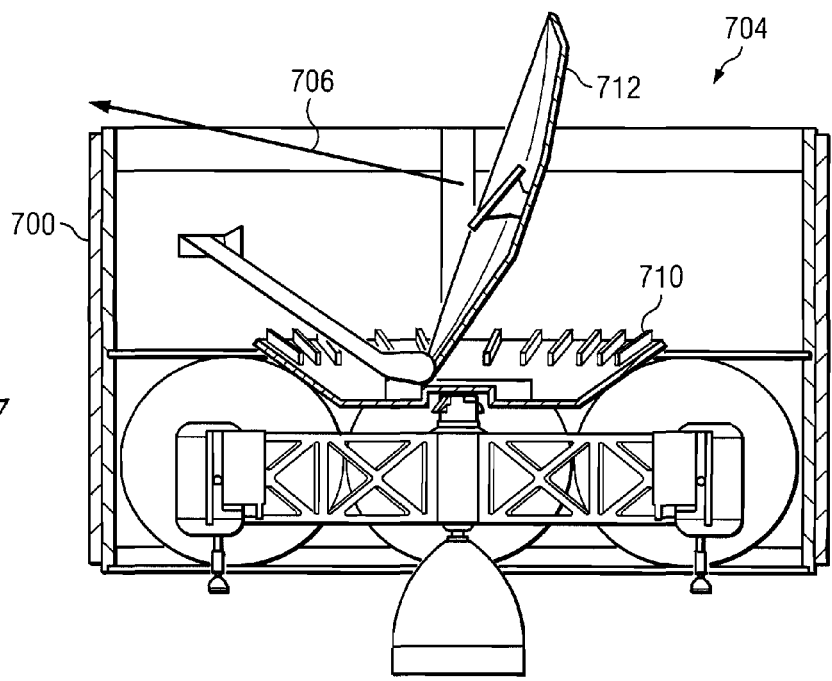
Figure 8:
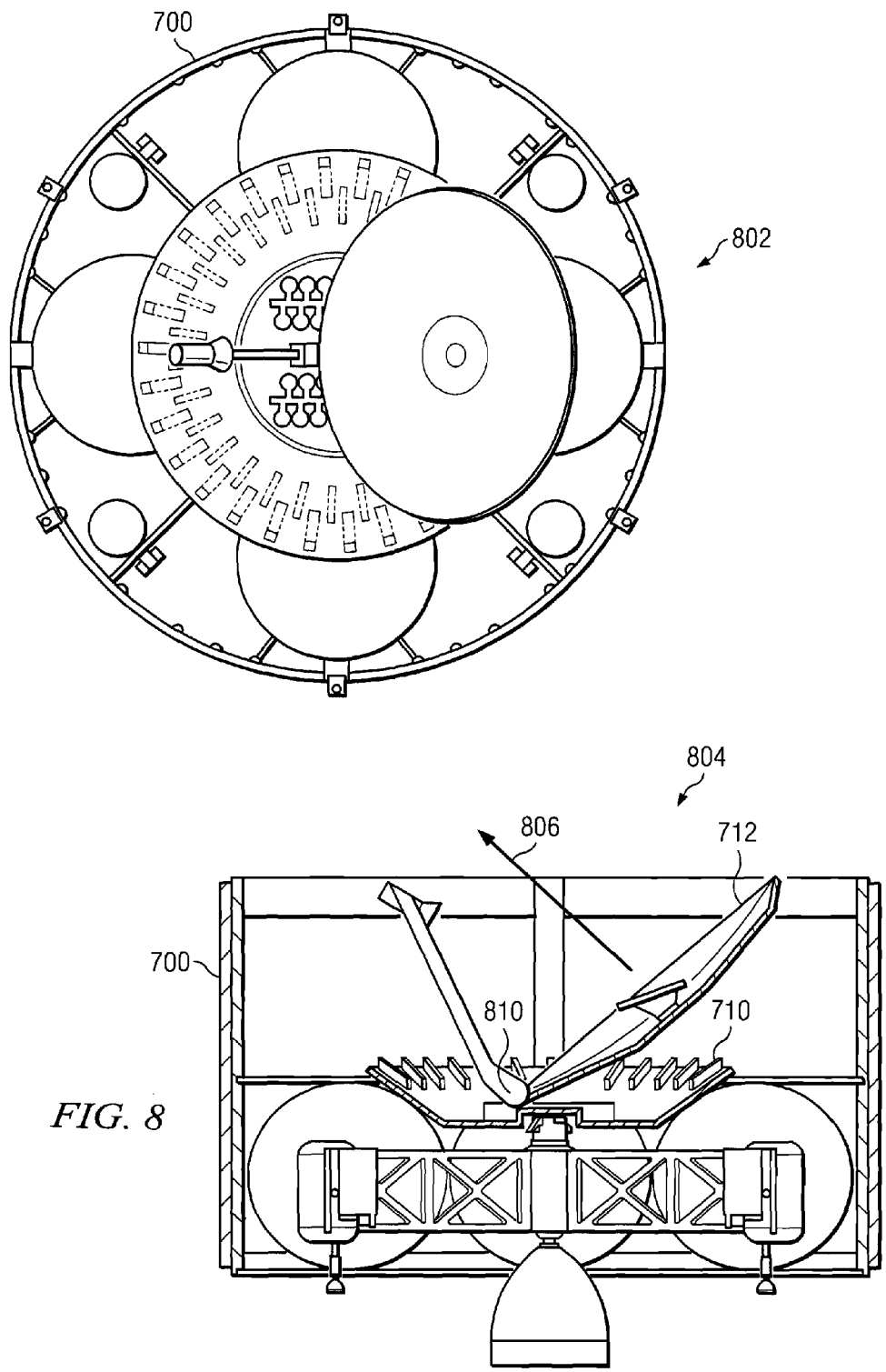
Figure 9:
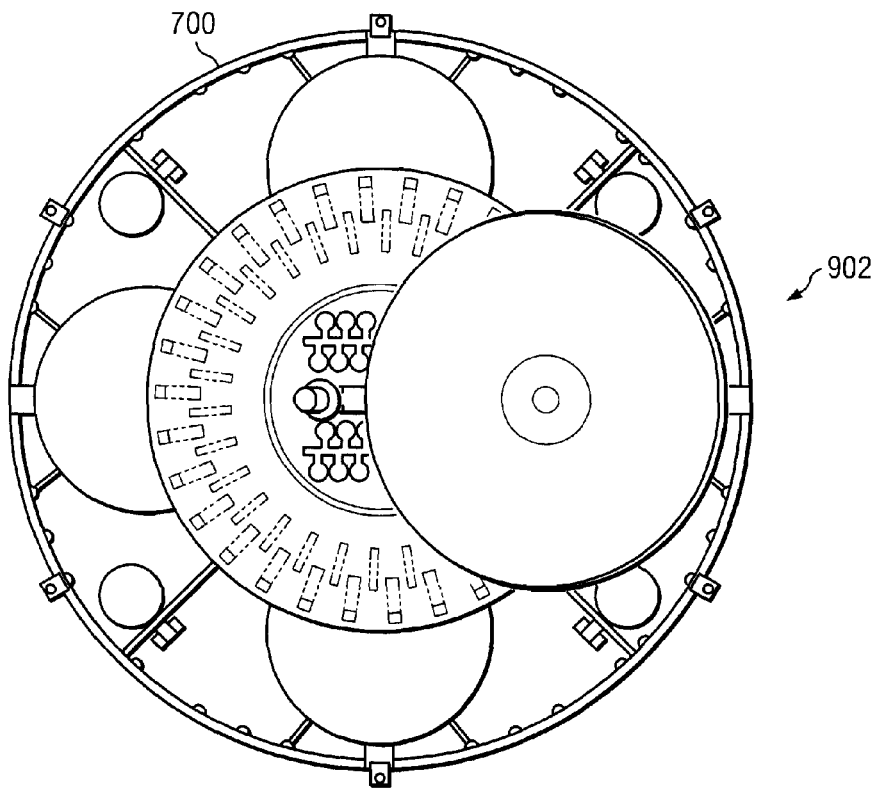
Figure 9:
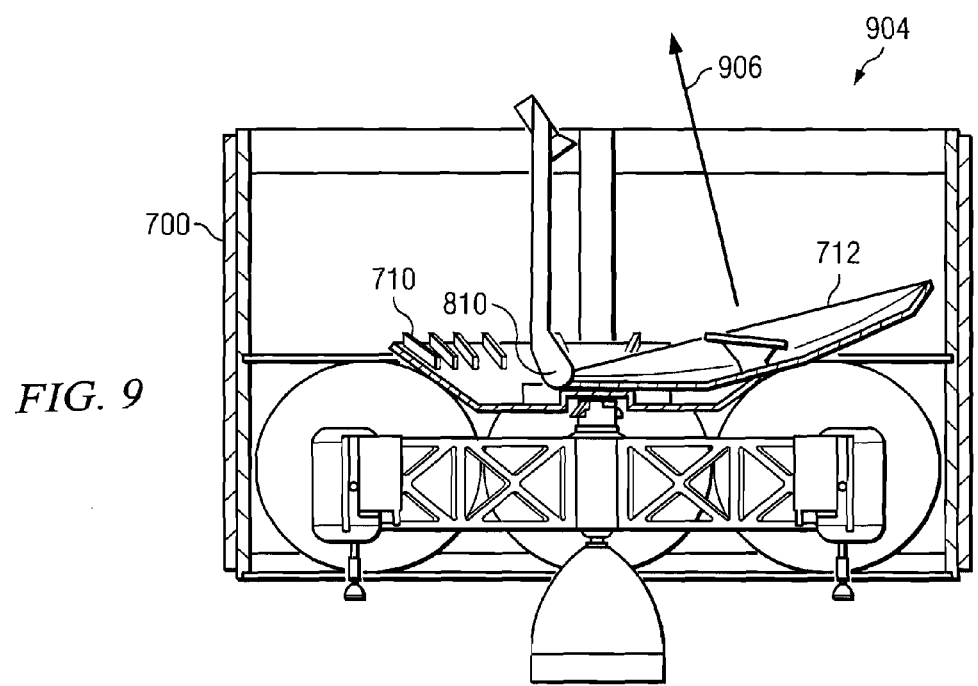

FIGS. 7-9 illustrate perspective top views 702, 802, 902 and cut-away side views 704, 804, 904 of a satellite 700 with a antenna assembly in first, second, and third positions in elevation with respect to platform 710, in accordance with an example embodiment. Referring first to FIG. 7, the antenna assembly is positioned, with respect to platform 710, so that reflector 712 reflects a downlink signal in a direction generally along a first beam direction vector 706. Referring now to FIG. 8, rotation of the antenna assembly via elevation adjustment mechanism 810, results in the antenna assembly being positioned, with respect to platform 710, so that reflector 712 reflects the downlink signal in a direction generally along a first beam direction vector 806. Referring now to FIG. 9, further rotation of the antenna assembly via elevation adjustment mechanism 810, results in the antenna assembly being positioned, with respect to platform 710, so that reflector 712 reflects the downlink signal in a direction generally along a first beam direction vector 906. As FIGS. 7-9 illustrate, the direction of beam direction vector 706, 806, 906 can be changed significantly, thus providing the capability to compensate for the pointing requirements throughout the operational portion of each orbit, during the operational life of the satellite 700.

Figure 10:
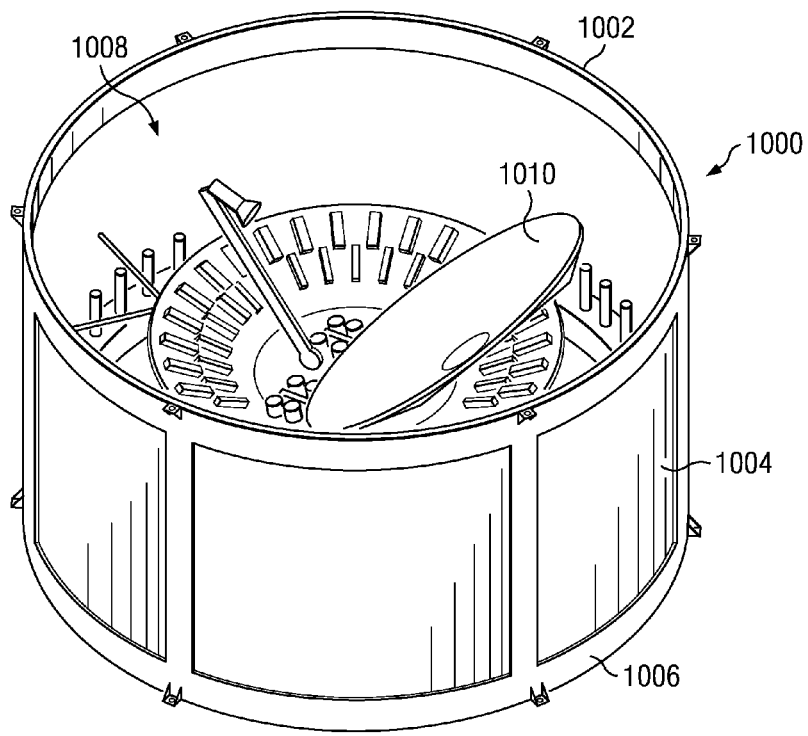
FIG. 10 illustrates a perspective view of a satellite, in accordance with an example embodiment.
Figure 11:
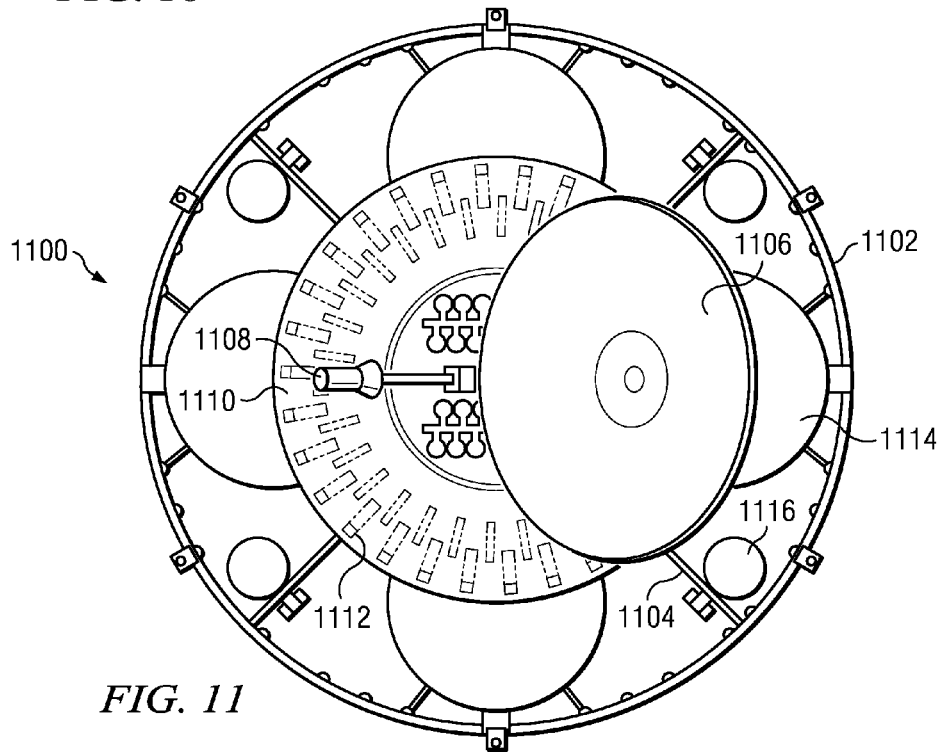
FIG. 11 illustrates a top view of a satellite, in accordance with an example embodiment.

In order to more fully depict the structure and arrangement of a satellite, in accordance with example embodiments, FIGS. 10 and 11 are provided, which illustrate a perspective view and a top view of a satellite, respectively. Referring first to FIG. 10, satellite 1000 is shown to include outer load path support structure 1002, which substantially contains the communications payload subsystem and the bus subsystem. As discussed previously, outer load path support structure 1002 may be substantially cylindrical, in an embodiment, with a substantially circular cross-section. In other embodiments, outer load path support structure 1002 may have a different cross-sectional shape (e.g., square, triangle, pentagon, hexagon, octagon, etc.). Outer load path support structure 1002 may be generally referred to as an elongated support structure adapted to contain the communications payload subsystem and the bus subsystem. In an embodiment, as will be discussed in conjunction with FIG. 5, outer load path support structure 1002 is adapted to support stacking of one or more other satellites above and/or below satellite 1000 within the payload fairing (e.g., payload fairing 1904, FIG. 13) of a launch vehicle. In an embodiment, outer load path support structure 1002 is further adapted to support at least one solar panel 1004 on its exterior surface 1006. Outer load path support structure 1002 includes an earth-oriented opening 1008, in an embodiment, which exposes reflector 1010.

Referring to FIG. 11, a top view of a satellite 1100 is illustrated. As discussed previously, outer load path support structure 1102 substantially contains the communications payload subsystem and the bus subsystem, and therefore defines an outer surface of satellite 1100. Bus subsystem is fixed to outer load path support structure 1102 with bus subsystem support structure 1104. During operations, when viewed from the earth, communications payload subsystem (e.g., reflector 1106, feed horn 1108, platform 1110, and communications electronics 1112) does not appear to rotate, while outer load path support structure 1102 and bus subsystem (e.g., bus subsystem support structure 1104, fuel tanks 1114, and fuel tanks 1116) do appear to rotate, in an embodiment. As discussed previously, the relative rotation between the subsystems is achieved using a despin control mechanism (e.g., despin control mechanism 530, FIG. 5). In another embodiment, the subsystems may not rotate, relative to each other.

As discussed previously, a system includes multiple satellites (e.g., six satellites, or some other number), which may travel within NGSO (e.g., Molniya or other orbits) and/or GSO orbits, and which may have a phasing maintained between each other in a manner that the satellite fleet may provide continuous coverage within one or more coverage areas. In order to achieve such a satellite fleet, each satellite is placed in an appropriate orbital plane and nodal position with respect to the other satellites of the fleet. In an embodiment, implementing the satellite fleet includes launching at least one set of satellites within a single launch vehicle, and then moving each satellite of the set into an appropriate orbit position, with respect to the other satellites of the fleet.

Figure 12:
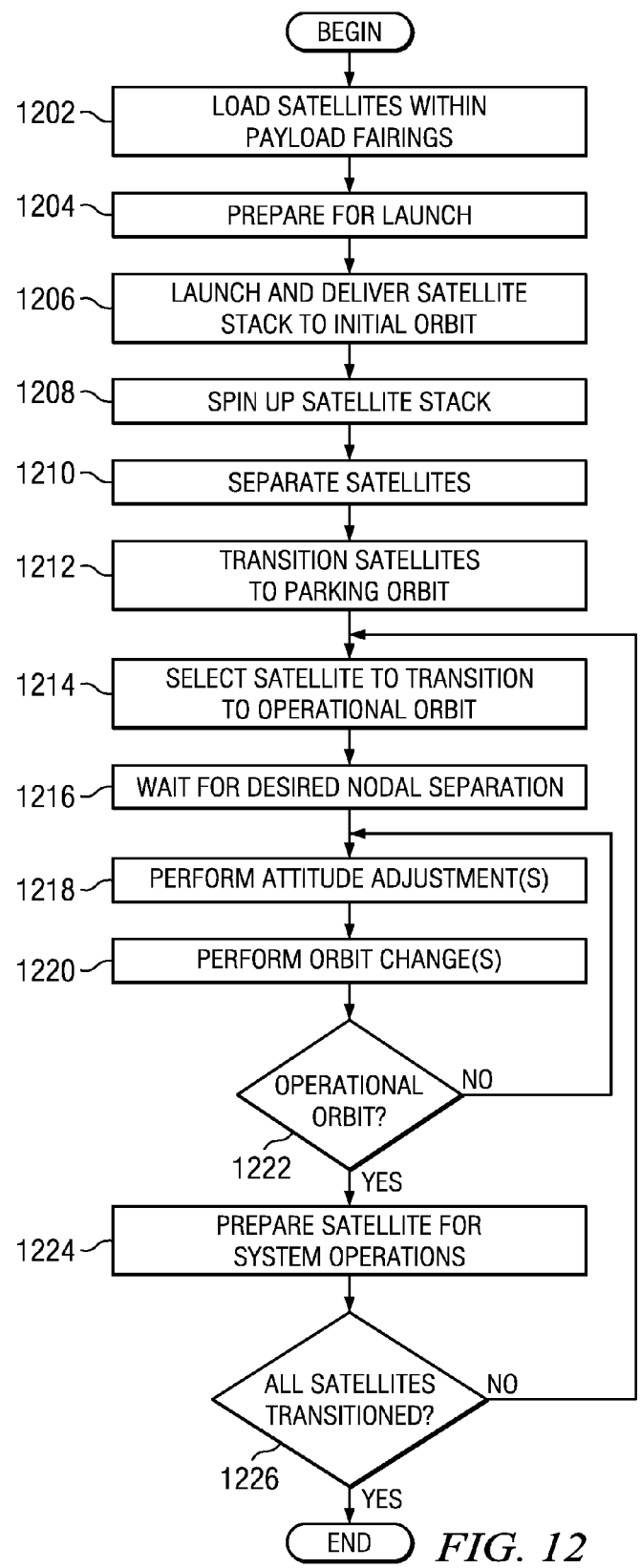
FIG. 12 illustrates a flowchart of a method for implementing a satellite fleet, in accordance with an example embodiment.

FIG. 12 illustrates a flowchart of a method for implementing a satellite fleet, in accordance with an example embodiment. As will be described in detail below, embodiments include launching multiple satellites (e.g., three satellites or some other number) within a single launch vehicle into an initial orbit, and subsequently transitioning each satellite into an operational orbit while achieving a desired nodal separation between the satellites. An "initial orbit" may be defined as an orbit into which the satellites initially are released from a launch vehicle. The initial orbit may be defined by an initial semimajor axis, orbit eccentricity (which in turn defines the altitudes at apogee and perigee), angle of inclination, node crossing (generally termed the right ascension of the ascending node, or RAAN), argument of perigee, and time of perigee (or true anomaly). An "operational orbit" may be defined as a "final" orbit within which system operations are performed (e.g., a Molniya orbit or other orbit, as discussed previously). The operational orbit may be defined by an operational semimajor axis, orbit eccentricity, angle of inclination, node crossing, argument of perigee, and time of perigee.

During the process of transitioning between the initial orbit and the operational orbit, each satellite may be transitioned to one or more intermediate orbits, as will be described in detail below. As will also be described in detail below, the system may permit each satellite to drift, for various periods of time, at the initial orbit and/or one or more intermediate orbits, in order to achieve a desired nodal separation between the satellite and other satellites of the fleet. Accordingly, embodiments of the inventive subject matter take advantage of the earth's gravitational field, specifically the difference in nodal regression rates between higher and lower orbits, to achieve the nodal separation between the satellites of a multiple-satellite launch. This is in contrast to traditional systems, which achieve nodal separation by firing booster rockets and consuming limited on-board fuel resources or by using dedicated launch vehicles (i.e., one launch vehicle per satellite). As the below description will convey, embodiments may have the advantages of economically implementing multiple satellites within their operational orbit positions while efficiently conserving limited fuel resources on-board each satellite.

The method begins, in block 1202, by loading multiple satellites within the payload fairing of a launch vehicle, in preparation for launch. In an embodiment, the launch vehicle includes a launch vehicle (e.g., a Land Launch Zenit-2SLB launch vehicle) capable of injecting the multiple satellites into the initial orbit. In an embodiment, three satellites are loaded in a stacked configuration within a payload fairing. In alternate embodiments, two, four, or another number of satellites may be loaded in a stacked configuration within a payload fairing. The number of satellites loaded within a single payload fairing may depend, at least in part, on the size and weight of each satellite, the physical capacity of the payload fairing, and the lift capacity of the launch vehicle.

Figure 13:
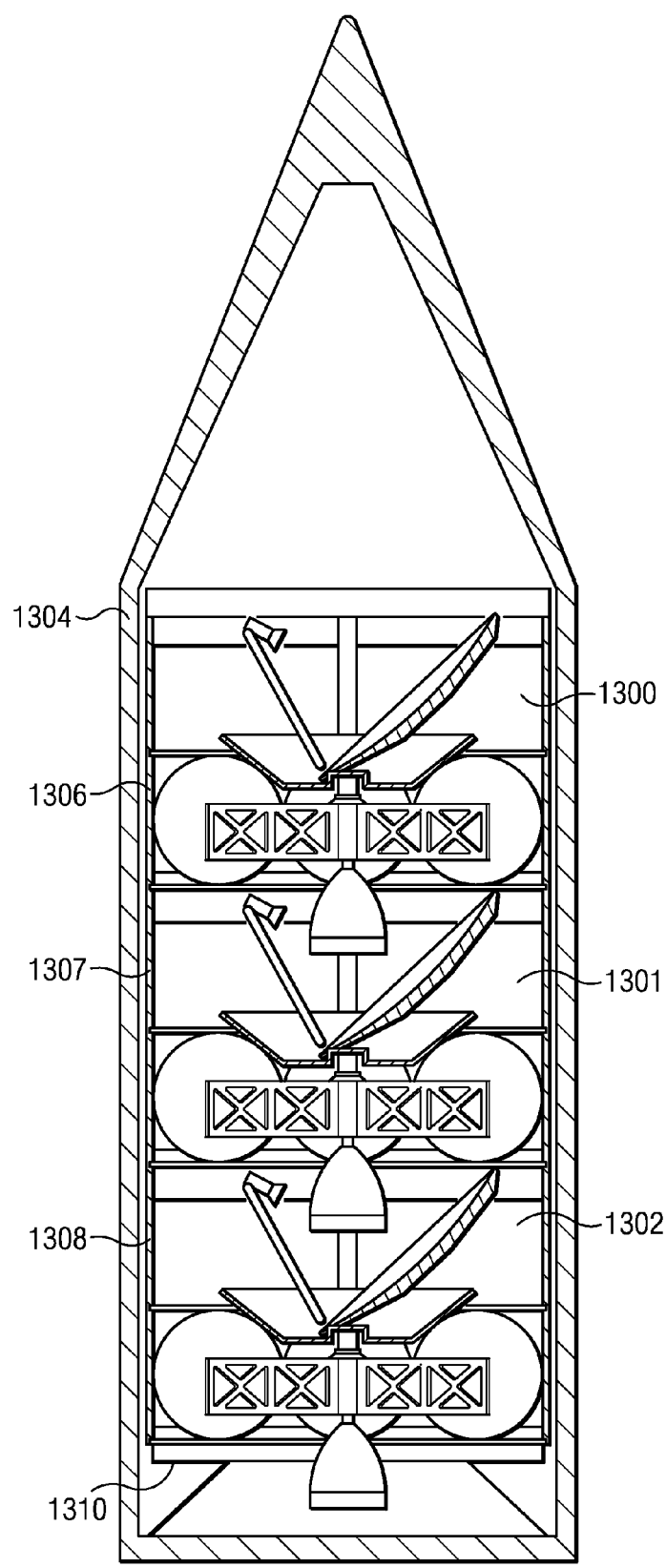
FIG. 13 illustrates a cross-sectional, side view of a configuration of multiple satellites stacked within a payload fairing of a launch vehicle, in accordance with an example embodiment.
Figure 14:
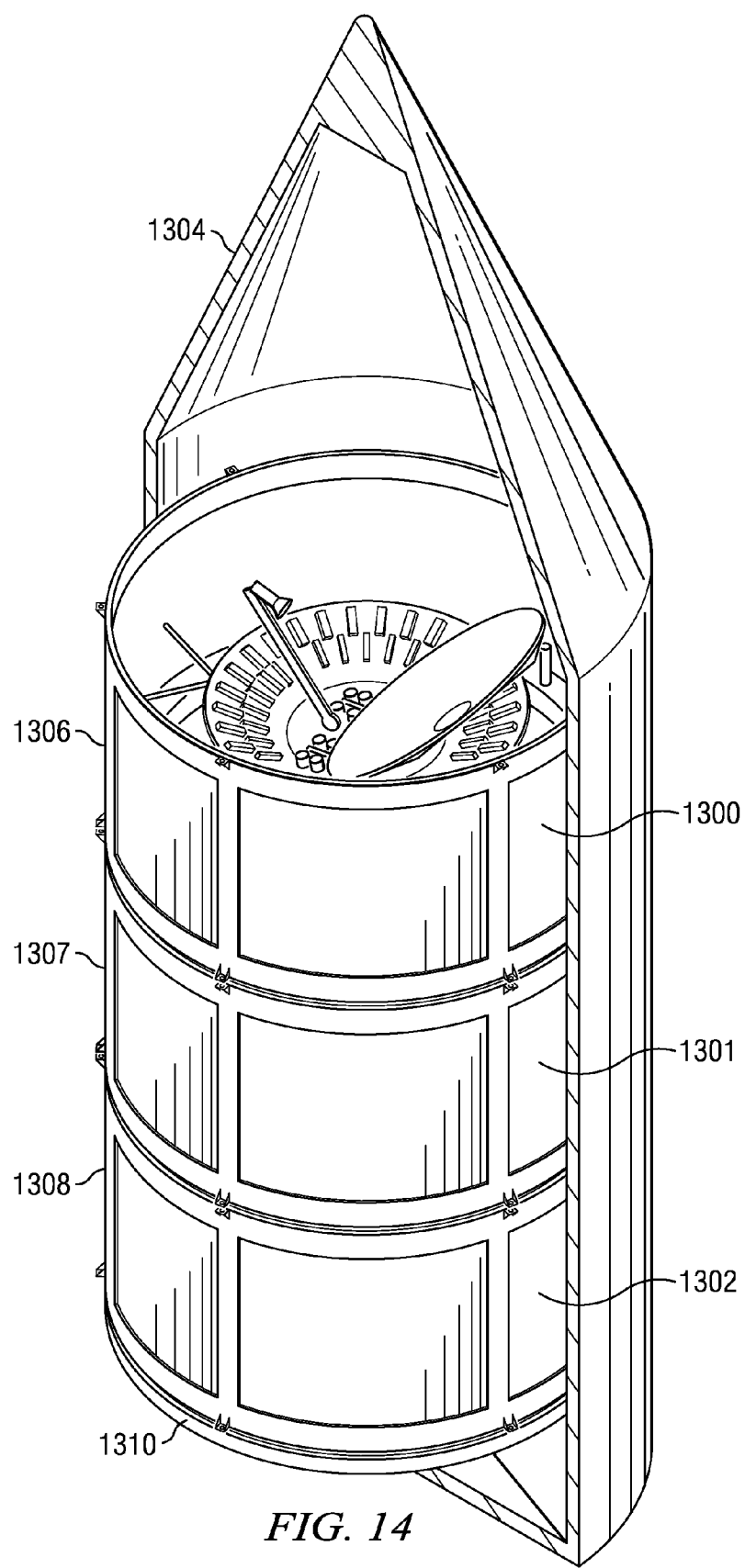
FIG. 14 illustrates a perspective view of a configuration of multiple satellites stacked within a cut-away payload fairing of a launch vehicle, in accordance with an example embodiment.

FIGS. 13 and 14 illustrate a cross-sectional, side view and a perspective view, respectively, of a configuration of multiple satellites 1300, 1301, 1302 stacked within the payload fairing 1304 of a launch vehicle, in accordance with an example embodiment. In an embodiment, payload fairing 1304 may have a diameter in a range of about 2 m to about 5 m, with a diameter of about 3.5 m in a particular embodiment. Satellites 1300-1302 are coupled together at the top and/or bottom edges of outer load support structures 1306, 1307, 1308. When coupled together, satellites 1300-1302 may be referred to herein as a "satellite stack" or a "group of satellites." In an embodiment, satellites 1300-1302 are coupled together with a plurality of explosive bolts and compressed, axial spring mechanisms (not illustrated), which may later be activated in an initial orbit to separate satellites 1300-1302 from each other. In addition, a spin up platform 1310 is attached to the bottom of lower satellite 1300, in an embodiment. As will be described in more detail later, "spin up" rockets (not illustrated) on spin up platform 1310 may be activated once the satellite stack has separated from payload fairing 1304, in order to spin-stabilize the satellite stack, in an embodiment. In other embodiments, the spin up rockets may be located elsewhere (e.g. towards the middle of the satellite stack), or other thrusters (e.g., radial thrusters 1660 and/or 1664, FIG. 16) may be used to achieve the spin up, or the launch vehicle, if capable, may provide the spin up prior to release of the satellite stack.

Each outer load path support structure 1306-1308 is adapted to couple, at its top and/or bottom, to one or more other satellites. In addition, each outer load path support structure 1306-1308 is adapted to bear the load from any satellite(s) that may be stacked above it. In an embodiment, substantially all of the weight of any higher satellites is born by outer load support structures 1306, 1307. Accordingly, the outer load support structure 1308 of the lower satellite 1302 is adapted to bear at least the weight from the center satellite 1301 and the upper satellite 1300, and the outer load support structure 1307 of the center satellite 1301 is adapted to bear at least the weight from the upper satellite 1300, in an embodiment.

Traditionally, satellites are either launched one at a time in a dedicated launch vehicle, or multiple satellites are launched together using load path structures substantially different from those described in conjunction with embodiments of the inventive subject matter. Launching satellites separately is extremely expensive, particularly when a satellite system includes a significant number of satellites. However, when multiple satellites are launched together, some type of load path structure is employed so that the satellites are not damaged during launch. Traditional methods for multiple satellite launch include some form of dedicated launch vehicle structure to support multiple satellites within the payload fairing. These support structures include various forms of cradles, dispensers or launch vehicle adapters. To avoid using a dedicated launch vehicle structure, some traditional satellites adapted for multiple satellite launches have employed inner load path support structures such as an inner thrust cylinder, rather than the outer load path support structures (e.g., structures 1306-1308) of embodiments of the inventive subject matter. In particular, traditional satellites are designed so that, when stacked within a payload fairing, the load of any higher satellite(s) is born by an inner load path structure that runs through the interior of the satellite. Traditional satellites that employ an inner load path stacked configuration typically are held together and then separated from each other using a mechanical connection and an internal thrust cylinder.

The use of outer load support structures 1306-1308, in accordance with an embodiment, may provide one or more advantages over traditional satellite configurations. In particular, the relatively large diameter of the outer load path support structure (e.g., structures 1306-1308) may provide substantially greater lateral stiffness, particularly within a high-vibration launch environment, than is provided by an inner load path support structure. In addition, because the outer load path support structures (e.g., structures 1306-1308) may have diameters that are slightly less than the diameter of the payload fairing (e.g., payload fairing 1304), placement or mounting of communications payload subsystem or bus subsystem elements is not affected by interference from the load path support structure, as it may be in satellites that include inner load path support structures.

Referring again to FIG. 12, once the satellites have been loaded into the payload fairing, the launch vehicle is prepared for launch at a desired launch site, in block 1204. In an embodiment, for example, a launch site may include the Cosmodrome, in Baikonur, Russia, although other launch sites may be selected in other embodiments.

Once the launch vehicle is ready and cleared to launch, the launch phases may be performed, in block 1206. The launch phases serve to boost the launch vehicle from the launch platform, and to deliver the satellite stack (i.e., satellites 1300-1302, FIG. 13) to an initial orbit. In an embodiment, the initial orbit may be substantially circular, and the initial altitude is an altitude in a range from 200 km to 400 km, with an altitude of 300 km being preferred.

Figure 15:
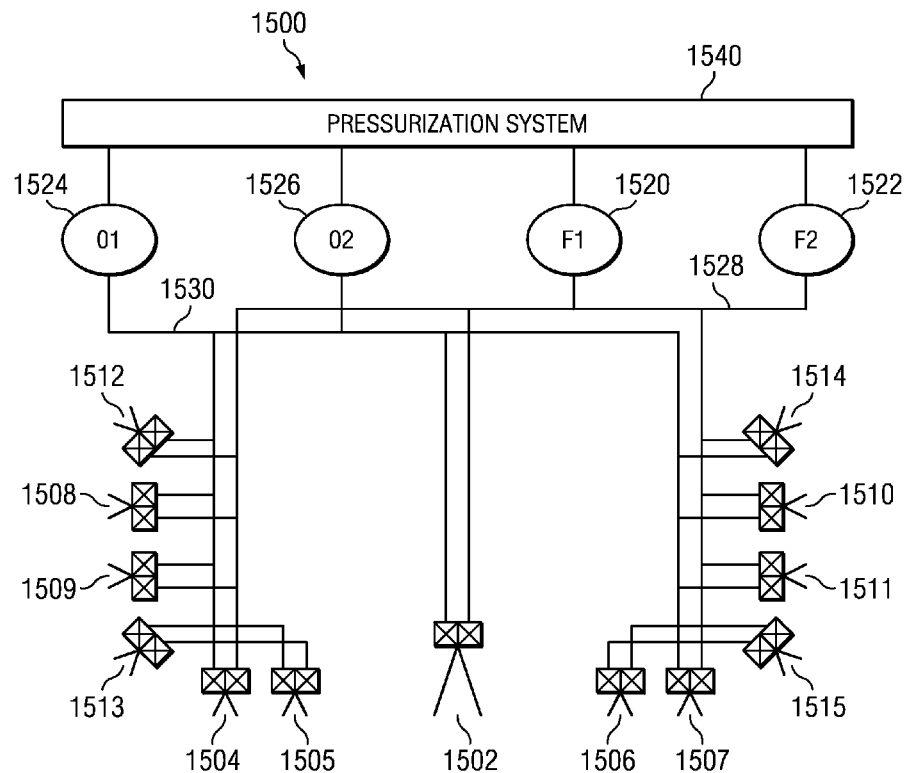
FIG. 15 illustrates a simplified diagram of a propulsion subsystem, in accordance with an example embodiment.

Before payload separation (i.e., release of the satellite stack from the payload fairing), the launch vehicle may impart a slow rotation to the satellite stack, which may result in settling the fuel in the satellites' fuel tanks (e.g., fuel tanks 1542, 1543, FIG. 15). Once the satellite stack has been released from the payload fairing, rockets on the spin up platform (e.g., spin up platform 1310, FIG. 13) may be activated to spin up the satellite stack, in block 1208, in an embodiment. In an embodiment, activation of the spin up platform is used to impart an axial rotation to the satellite stack around the satellites' primary axes (e.g., primary axis 504, FIG. 5) at a spin velocity in a range of about 20 to 40 revolutions/minute (rev/min), with a spin velocity of about 30 rev/min being preferred. Once the desired spin velocity is achieved, the spin up platform (e.g., spin up platform 1310, FIG. 13) may be separated from the satellite stack. In another embodiment, satellite thrusters (e.g., thrusters 1504-1515, FIG. 15) may be used to spin up the satellites and/or the satellite stack, in which case the spin up platform may be excluded. In still another embodiment, the launch vehicle may spin up the satellite stack prior to release from the payload fairing. At that point, the satellite stack may be released from the payload fairing, or each satellite may be sequentially released from the payload fairing one at a time. In the latter case, block 1210 (described below) may be excluded. Because the satellites are induced to spin around the primary axis, the primary axis may also be referred to as the "spin axis."

In block 1210, the satellites (e.g., satellites 1300-1302) may be separated from each other. In an embodiment, the satellites are separated by detonating explosive bolts that were used to couple together the outer load path support structures (e.g., outer load path support structures 1306-1308, FIG. 13) of the satellites. Compressed axial, separation springs positioned between the outer load path support structures may then be freed to impart a relatively small axial velocity the satellites away from each other. As mentioned previously, the satellites already may be spinning around their primary axes at a nominal speed as a result of impulses generated by the spin up platform (e.g., spin up platform 1310, FIG. 13). In another embodiment, the satellites may spin themselves up to a nominal spin speed (e.g., about 30 rev/min), using appropriate thrusters (e.g., radial thrusters 1660, 1664, FIG. 16). In such an embodiment, a spin up platform may be excluded from the system.

Once the satellites are separated, each satellite may be transitioned from the initial orbit to a "parking orbit," in block 1212. In an embodiment, the parking orbit may be selected to provide for relatively long communication passes between a satellite and a ground control station, in addition to providing substantially faster nodal regression than a final operational orbit. During these communication passes, the satellite may transmit telemetry information to the ground control station, and the ground control station may transmit command messages to the satellite. In an embodiment, the parking orbit may have an apogee altitude in a range of about 1200-1800 km, with about 1500 km being a preferred apogee altitude. Higher or lower apogee altitudes may be used, in other embodiments. In still other embodiments, where communications at a lower orbit such as the initial orbit are not an issue, block 1212 may be excluded.

The transition from the initial orbit to the parking orbit may require a velocity increment in a range of about 1500 m/s to 4000 m/sec, in an embodiment, with a velocity of about 2500 m/sec being reasonable. In an embodiment, some or all orbit changes are made using booster rocket burns when a satellite is in the vicinity of perigee. Accordingly, prior to transitioning the satellites from the initial orbit, the satellites may be permitted to travel in their orbits until they are at or near perigee. In an embodiment, each satellite is transitioned to the parking orbit within a small number of orbital periods after being released at the initial orbit. In another embodiment, the launch vehicle may place the satellites directly into the parking orbit, and block 1212 may be excluded.

After transition into the parking orbit in block 1212 (or after release into the initial orbit, if block 1212 is not performed), the satellites are separately transitioned into their operational orbits, in an embodiment. To initiate the transition of the satellites to their operational orbits, a first satellite is selected for transition, in block 1214. As will be described below, the selected satellite may be transitioned from the parking orbit (or from the initial orbit) to the operational orbit by performing a series of one or more orbit changes. Each of these orbit changes may be made, for example, by performing a booster rocket burn (e.g., booster rocket 522, FIG. 5). In an embodiment, prior to beginning the orbit transition, the system may maintain a satellite in the parking orbit (or initial orbit if block 1212 is omitted) for a drift time period, in block 1216, in order to allow the selected satellite to drift toward the desired nodal position and/or to establish a desired nodal separation between the selected satellite and previously transitioned satellites, if any. When a first satellite of the fleet has been selected and is being transitioned to the operational altitude, the system may bypass the process of block 1216, as the first satellite's position may be used as the baseline by which later-transitioned satellites' nodal positions are determined. As is described below, embodiments of the inventive subject matter take advantage of the differences in nodal regression rates for different orbits in order to achieve desired nodal separations between satellites of a fleet. Accordingly, embodiments may use significantly less on-board fuel resources in order to achieve desired nodal separations than traditional systems, which rely on booster rocket burns to achieve nodal separations, or which avoid the use of separate launch vehicles to achieve nodal separations.

The RAAN for a satellite drifts at a rate that varies based on the satellite's orbit. In particular, the RAAN drifts relatively quickly at the initial orbit (e.g., approximately 4°/day at 300 km circular), and relatively slowly at the operational orbit (e.g., approximately 0.14°/day at 39,560 km). The rate at which a RAAN drifts may be referred to as a nodal regression rate. As mentioned above, a selected satellite may be maintained at one or more orbits that are lower than the operational orbit (e.g., the initial orbit, the parking orbit, and/or one or more other intermediate orbits) for one or more drift time periods, in order to allow the selected satellite to drift and establish a desired nodal separation between the selected satellite and one or more other satellites of the fleet. For example, the system may wait a cumulative drift time period in a range of about 12 days to about 20 days to achieve a 60° nodal separation between neighboring satellites within a fleet, in an embodiment. Alternatively, the system may wait longer or shorter time periods to achieve larger or smaller nodal separations, respectively. In some cases, a portion of the desired nodal separation may occur while the satellite is being transitioned between orbits.

During the transition to the operational orbit, the selected satellite's attitude and orbit repeatedly may be adjusted. For example, in order to achieve fuel-efficient booster rocket burns, the selected satellite's attitude may be adjusted prior to each burn, and each burn may transition the satellite only partially toward the operational orbit. The iterative process of transitioning each satellite to its operational orbit is conveyed in blocks 1218-1222.

In block 1218, the selected satellite may perform one or more attitude adjustments. Because of the orientation of the booster rocket (e.g., booster rocket 522, FIG. 5) with respect to the satellite's primary axis (e.g., primary axis 504, FIG. 5), the thrust direction is along the satellite's primary axis, in an embodiment. Attitude adjustments desirably are made so that, prior to an orbit change (e.g., prior to a booster rocket burn), the satellite's primary axis is pointed in a direction that may result in the desired orbit change using a minimal amount of fuel. Using telemetry information received from the satellite (and/or other information) during a communication pass, the ground control station may determine the satellite's current attitude (e.g., current roll, pitch, and yaw angles). The ground control station may then compare the current attitude to a desired attitude (e.g., a desired attitude that should be attained prior to a next rocket booster burn), and determine parameters for thruster activation (or other means of changing the satellite's attitude) that will enable the satellite to achieve the desired attitude. For example, thruster activation parameters may indicate the identities of thrusters that should be activated, start and stop times (or a duration) for each thruster activation, thrust levels, and thruster activation sequence information. The ground control station may then generate one or more attitude adjustment command messages that indicate the thruster activation parameters, and send the command messages to the satellite during the same communication pass or during a later communication pass. The satellite may then perform the attitude adjustments specified in the ground control station command messages. In an embodiment, a satellite may perform one or more attitude adjustment iterations prior to performing an orbit change.

In block 1220, the satellite may perform one or more orbit changes. In an embodiment, the ground control station also may use information received from the satellite (and/or other information) to determine the satellite's current orbit. The ground control station may then compare the current orbit to a desired orbit (e.g., a next intermediate orbit or the operational orbit), and determine parameters for a booster rocket burn that will enable the satellite to achieve the desired orbit. For example, booster rocket burn parameters may include one or more start and stop times (or durations) for one or more burns. The ground control station may then generate one or more orbit adjustment command messages that indicate the booster rocket burn parameters, and send the command messages to the satellite during the same communication pass or during a later communication pass. The satellite may then perform the orbit adjustments specified in the ground control station command messages. The satellite may make an orbit adjustment by imparting an adequate velocity increment using a booster rocket (e.g., rocket 522, FIG. 5). In an embodiment, the ground control station may send separate command messages indicating thruster activation parameters and booster rocket burn parameters. In another embodiment, the thruster activation parameters and the booster rocket burn parameters may be sent to a satellite in the same message.

A determination may be made, in block 1222, whether the satellite has achieved its desired operational orbit. Depending on various factors, it may take about 7 to 10 days to transition a satellite into its desired operational orbit. Alternatively, the transition may take a longer or shorter period of time. When the satellite has not achieved it desired operational orbit, then the method may iterate as shown.

When the satellite has achieved the desired operational orbit, the satellite is prepared for system operations, in block 1224. In an embodiment, this includes adjusting the satellite's attitude to place the satellite in an operational attitude. In an embodiment, as discussed previously, the operational attitude is an ecliptic normal attitude (i.e., the satellite's primary axis (e.g., primary axis 504, FIG. 5) is perpendicular to the ecliptic). Adjustment to the operational attitude may be achieved through thruster activations, as discussed previously. Preparing the satellite for system operations also may include "despinning" the communications payload subsystem, in an embodiment. This may be achieved by activating the despin control mechanism (e.g., despin control mechanism 530, FIG. 5) and damping the spin on the communications payload subsystem until it appears relatively stationary, when viewed from the earth.

Preparation for system operations also may include orienting the satellite's antenna assembly in the proper direction to support uplink reception and downlink signal transmission into a desired coverage area (e.g., coverage area 306, FIG. 3). As described previously, this may include orienting the antenna assembly about an azimuth axis (e.g., axis 604, FIG. 6, as controlled by the despin control mechanism 530, FIG. 5) and an elevation axis (e.g., axis 610, FIG. 6, as controlled by the elevation adjustment mechanism 620). These adjustments, together with a figure of revolution antenna pattern, allow correct antenna pointing over a coverage area and compensate for differences in orbit planes (RAAN) and nodal regression, as discussed previously. These rotational adjustments may be performed continuously or in periodic, discrete steps during the operational life of the satellite.

In block 1226, a determination may be made whether all satellites previously in the satellite stack have been transitioned into the desired operational altitude. When all satellites have not been transitioned, then another satellite is selected, in block 1214, and the method iterates as shown for the newly selected satellite.

When all satellites have been transitioned into their desired operational orbits, the method ends for this set of satellites. When a satellite fleet includes more than the number of satellites within the first launch (e.g., more than three satellites), as is the case for system embodiments previously described herein, the entire process may be repeated for one or more additional groups of satellites. In a system embodiment that includes six satellites within its fleet, the process may be repeated once. In other words, a second launch vehicle may be launched, which includes a second group of satellites within its payload fairing. The second group may be released in an initial orbit, and each satellite of the second group may be sequentially transitioned to their operational orbits, in a manner such that desired nodal separations are established between satellites of the first group and satellites of the second group. In an embodiment, the initial orbit for the second group of satellites may be about 180° separated from the initial orbit for the first group of satellites. In other embodiments, the initial orbit for the second group of satellites may have a different separation angle from the initial orbit for the first group of satellites. Once the satellites within the fleet have been successfully positioned within their operational orbits, regular system operations may be performed. For example, the system may begin providing satellite services (e.g., DBS television services), in an embodiment.

Example embodiments described above discuss launching three satellites within a single launch vehicle. Those of skill in the art would understand, based on the description herein, how to alter the above described embodiments in order to launch more (e.g., four or more) or fewer (e.g., two) satellites within a single launch vehicle, and further how to transition those satellites into their operational orbits while achieving desired nodal separations. Accordingly, alternate embodiments in which more or fewer satellites are launched within a launch vehicle are intended to be included within the scope of the inventive subject matter.

Once the satellite fleet is implemented, the system may begin operations. In an embodiment, each satellite may be in an inactive mode prior to system operations startup and whenever a satellite is located within an inactive orbit segment. In an inactive mode, a satellite may conserve power by maintaining communications and control systems in a low-power state, and the satellite may refrain from transmitting downlink signals or receiving uplink signals, with the possible exception of health, status, and control-types of signals. Whenever a satellite is located within an active orbit segment, a satellite may be in an active mode. In an active mode, a satellite may maintain communications and control systems in an operational-power state, and the satellite may receive uplink signals and transmit downlink signals (e.g., television signals).

During the operational life of the satellite, satellite orbit maintenance is actively performed, in order to correct for orbital deviations. The primary orbital parameters that should be controlled include the argument of perigee, the semi-major axis, the eccentricity, the inclination and the node (RAAN). Orbital deviations may be caused by higher order terms of the earth's gravitational field, gravitational fields of the sun and the moon, and other factors, such as solar pressure. These perturbing forces may be countered by activating the satellite thrusters (e.g., thrusters 524. FIG. 5) and/or the satellite booster rocket (e.g., booster rocket 522, FIG. 5). Both during and after implementation of the satellite fleet, the satellite thrusters may be used to perform spin up operations (e.g., process 1208, FIG. 12), spin down operations, and attitude adjustments (e.g., process 1218, FIG. 12), while the booster rocket may be used to perform significant orbit changes (e.g., process 1220, FIG. 12).

In an embodiment, velocity increments to maintain the satellite's orbit may be in the orbit plane or nearly perpendicular to the orbit plane. For example, velocity increments in the orbit plane may be applied to correct semi-major axis, eccentricity, and argument of perigee orbital errors, in an embodiment. Velocity increments perpendicular to the orbit plane may be applied to correct inclination and RAAN. To correct the orbital errors, thrusters are placed on a satellite in an arrangement where velocity increments may be provided in three perpendicular axes (or nearly perpendicular axes), in an embodiment. Orbital errors may be corrected by firing one or more thrusters at appropriate times in the orbit. For embodiments that include spinning satellites, the thruster firings are made at the appropriate times in the spin cycle. Because the satellites are operated in ecliptic normal attitudes, in an embodiment, the orbit plane varies with respect to the coordinate system of the satellite. Accordingly, when the thruster firings do not result in the desired in-plane or perpendicular velocity increments, then the thrusters may be fired at appropriate times and for appropriate durations and vector summed to achieve the desired increment. This results in a significant total velocity increment that may be applied in order to maintain the satellite's orbit. For example, a total velocity increment in a range of about 1000 m/s to about 2000 m/s may be applied, with a total velocity increment of about 1500 m/s being possible in an embodiment.

Embodiments of the inventive subject matter include methods and apparatus for providing satellite orbit maintenance in a manner that may consume on-board fuel in an efficient and conservative manner. In an embodiment, a propulsion subsystem is provided, which includes a booster rocket and a plurality of thrusters strategically positioned around the satellite so that on-board fuel is efficiently consumed. Embodiments of propulsion subsystems and thruster positions are illustrated and described in conjunction with FIGS. 15-17.

FIG. 15 illustrates a simplified diagram of a propulsion subsystem 1500, in accordance with an example embodiment. Propulsion subsystem 1500 includes a booster rocket 1502 (e.g., an LPE), a plurality of axial thrusters 1504, 1505, 1506, 1507, a plurality of radial thrusters 1508, 1509, 1510, 1511, and a plurality of canted thrusters 1512, 1513, 1514, 1515, in an embodiment. Booster rocket 1502 and thrusters 1504-1515 are illustrated as hypergolic chemical thrusters, but may include, for example, Hall-effect thrusters, plasma thrusters, electric thrusters, ion engines, and/or other types of thrusters adapted to produce a high specific impulse. Although four each of axial thrusters 1504-1507, radial thrusters 1508-1511, and canted thrusters 1512-1515 (i.e., twelve total thrusters 1504-1515) are illustrated in FIG. 15, propulsion subsystem 1500 may include more and/or fewer of any particular type of thrusters. Further, in various embodiments, certain ones of thrusters 1504-1515 may be primary thrusters (i.e., thrusters used during normal operations), and certain ones of thrusters 1504-1515 may be backup thrusters (e.g., in the event of failure of a primary thruster). In some cases, a particular thruster may serve as both a primary and a backup thruster.

Propulsion subsystem 1500 also includes one or more fuel tanks 1520, 1522 and one or more oxidizer tanks 1524, 1526, which are coupled to booster rocket 1502 and thrusters 1504-1515 through supply lines 1528, 1530. Propulsion system 1500 may also include a pressurization system 1540 to maintain adequate pressure within fuel tanks 1520, 1522 and oxidizer tanks 1524, 1526, and may also include valves, regulators, filters, and other components (not illustrated). Thrusters 1504-1515 may be placed in various locations on a satellite in order to provide for satellite attitude, altitude, and primary axis spin adjustments. Thrusters 1504-1515 may be fired in time bursts and/or in pulsed sequences. Embodiments of thruster placement are illustrated and described in conjunction with FIGS. 16 and 17.

Figure 16:
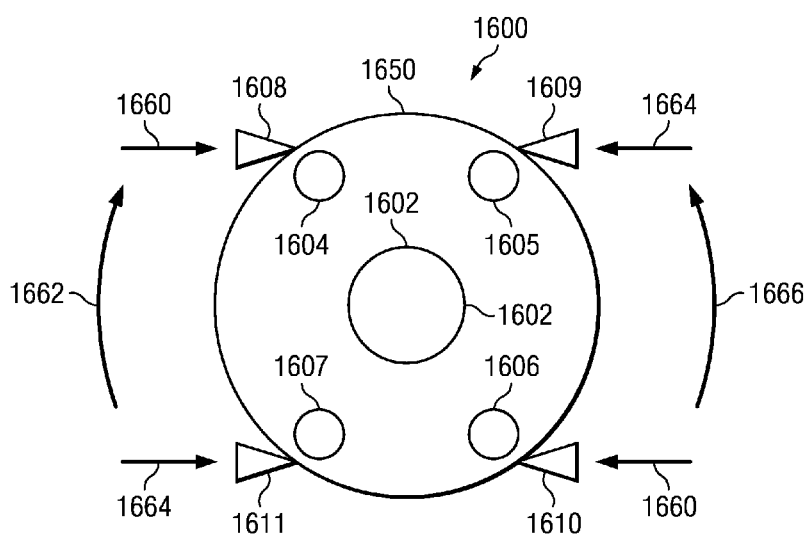
FIG. 16 illustrates a simplified bottom view of a satellite, illustrating a rocket booster, axial thrusters, and radial thrusters, in accordance with an example embodiment.

FIG. 16 illustrates a simplified bottom view of a satellite 1600, illustrating rocket booster 1602, axial thrusters 1604, 1605, 1606, 1607, and radial thrusters 1608, 1609, 1610, 1611, in accordance with an example embodiment. Rocket booster 1602 may be positioned in the center of satellite 1600, so that it may impart an impulse coincident with the primary axis (e.g., primary axis 504, FIG. 5) of satellite 1600 (i.e., in a direction that is into the page). Accordingly, rocket booster 1602 is adapted to move satellite 1600 from one orbit to another (e.g., raising the orbit apogee).

Axial thrusters 1604-1607 may be positioned at the bottom of satellite 1600 between the primary axis and the outer cylinder 1650 of satellite 1600. In an embodiment, axial thrusters 1604-1607 are positioned in a range of 50% to 90% of the distance from the primary axis to the outer cylinder 1650 of the satellite. In other embodiments, axial thrusters 1604-1607 may be positioned closer to or farther from the primary axis. Axial thrusters 1604-1607 are oriented to impart impulses that are substantially parallel to the primary axis (i.e., in a direction that is into the page). When fired simultaneously, axial thrusters 1604-1607 also may impart an impulse coincident with the primary axis. Accordingly, axial thrusters 1604-1607 are adapted to provide a velocity increment in the axial direction to control the orbit. However, when fired separately and/or sequentially, axial thrusters 1604-1607 may cause satellite 1600 to rotate about axes (not illustrated), which are perpendicular to the primary axis. Accordingly, axial thrusters 1604-1607 are adapted to re-orient the satellite's primary axis. In an embodiment, a primary thruster for primary axis control may be any one or more of axial thrusters 1604-1607. If a primary thruster fails, then another one or more of axial thrusters 1604-1607 may be considered backup thrusters for primary axis adjustment.

Radial thrusters 1608-1611 may be positioned around the outer cylinder 1650 of satellite 1600. Radial thrusters 1608-1611 are oriented to impart impulses that are substantially perpendicular to the primary axis. In an embodiment, radial thrusters 1608-1611 are located in positions that are coincident with a plane that bisects the satellite's center of gravity (e.g., plane 1714, FIG. 17), and which is perpendicular to the primary axis. Radial thrusters 1608-1611 may be positioned at substantially equal distances from each other around outer surface 1650 (e.g., approximately 90° apart around a substantially circular outer surface), in an embodiment. In other embodiments, the distances between radial thrusters 1608-1611 may be unequal.

In an embodiment, a first set of radial thrusters, which includes at least one radial thruster (e.g., radial thrusters 1608, 1610), may impart impulses, indicted by impulse vectors 1660, which produce a clockwise rotational vector 1662 around the primary axis. A second set of radial thrusters, which includes at least one other radial thruster (e.g., radial thrusters 1609, 1611), may impart impulses, indicated by impulse vectors 1664, which produce a counter-clockwise rotational vector 1666 around primary axis. Accordingly, radial thrusters 1608-1611 are adapted to increase and decrease a rate of spin around the primary axis. In an embodiment, the first set of radial thrusters includes radial thrusters 1608, 1610, and may be the primary set of thrusters for spin up of satellite 1600. If either of radial thrusters 1608, 1610 fails, then the other one of radial thrusters 1608, 1610 may be considered the backup thruster for spin up of satellite 1600. The second set of radial thrusters includes radial thrusters 1609, 1611 may be the primary set of thrusters for spin down of satellite 1600. If either of radial thrusters 1609, 1611 fails, then the other one of radial thrusters 1609, 1611 may be considered the backup thruster for spin down of satellite 1600. When fired in pairs, such as 1608 and 1611 or 1609 and 1610, the radial thrusters impart a radial velocity (i.e., a velocity perpendicular to the spin axis) on the satellite 1600. The thrusters are pulsed and the direction of the velocity is determined by the position of the thruster within the spin cycle when the pulse occurs.

Figure 17:
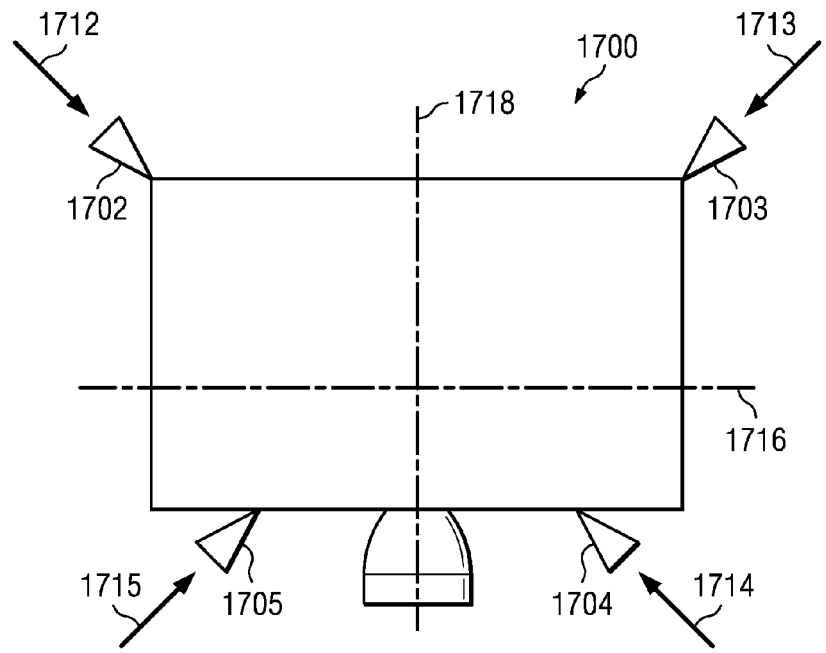
FIG. 17 illustrates a simplified side view of a satellite, illustrating canted thrusters, in accordance with an example embodiment.

FIG. 17 illustrates a simplified side view of a satellite 1700, illustrating canted thrusters 1702, 1703, 1704, 1705, in accordance with an example embodiment. Canted thrusters 1702-1705 may be positioned around the outer surface 1710 of satellite 1700. Canted thrusters 1702-1705 are oriented to impart impulses that substantially intersect the satellite's center of gravity, as indicated by vectors 1712, 1713, 1714, 1715. Canted thrusters 1702-1705 are adapted to provide a velocity increment. As with the radial thrusters, the canted thrusters may be pulsed, and the direction of the velocity increment is determined by the thruster selected and the position of the thruster within the spin cycle. Multiple canted thrusters (e.g., thrusters 1702-1705), axial thrusters (e.g., thrusters 1604-1607, FIG. 16), and radial thrusters (e.g., thrusters 1608-1611, FIG. 16) may move satellite 1700 in a direction coincident with the sum of the impulse vectors from the thrusters. By appropriate selection of the thrusters fired and their durations, the fuel required to provide orbital correction is reduced compared to conventional orthogonal thruster sets.

In an embodiment, a first set of "upper" canted thrusters, which includes at least one canted thruster (e.g., canted thrusters 1702, 1703), may be positioned above a plane 1716 that bisects the satellite's center of gravity, and which is perpendicular to primary axis 1718. A second set of "lower" canted thrusters, which includes at least one canted thruster (e.g., canted thrusters 1704, 1705), may be positioned below plane 1716. A "cant angle" may be defined as an angle between a thruster's impulse vector (e.g., vectors 1712-1715) and plane 1716. In an embodiment, the cant angle for upper canted thrusters 1702, 1703 may be in a range of about 30° to about 60°, with a cant angle of about 44° being preferred. The cant angle for lower canted thrusters 1704, 1705 may be in a range of about 30° to about 60°, with a cant angle of about 38.4° being preferred.

A first subset of the available axial thrusters (e.g., thrusters 1604-1607, FIG. 16), radial thrusters (e.g., thrusters 1608-1611), and/or canted thrusters 1702-1705 may be considered the primary thrusters for satellite orbit maintenance, in an embodiment. For example, axial thrusters 1605, 1607, radial thrusters 1609, 1610, and canted thrusters 1703, 1704 may be considered the primary thrusters for satellite orbit maintenance. If any one or more of the primary thrusters fails, then one or more of the other axial, radial, and/or canted thrusters may be used as backup thrusters.

Figure 18:
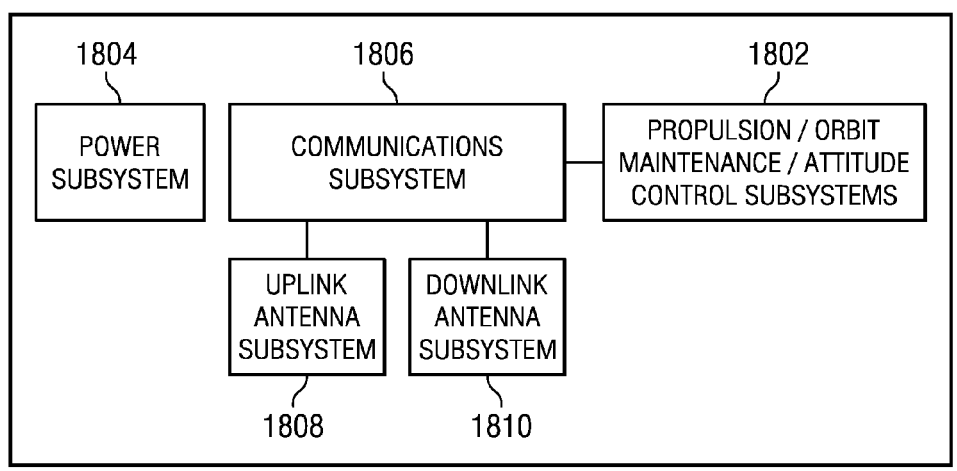
FIG. 18 illustrates a simplified block diagram of various satellite subsystems, in accordance with an example embodiment.

FIG. 18 illustrates a simplified block diagram of various satellite subsystems, in accordance with an example embodiment. Although the description of FIG. 18 is directed toward a satellite that provides DBS satellite services, a satellite that implements embodiments of the inventive subject matter may provide other commercial or non-commercial services, in other embodiments. Satellite 1800 may include propulsion/orbit maintenance/attitude control subsystems 1802, a power subsystem 1804, at least one communications subsystem 1806, an uplink antenna subsystem 1808, a downlink antenna subsystem 1810, in an embodiment. Power subsystem 1804 may provide electrical power to propulsion/orbit maintenance/attitude control subsystems 1802, communications subsystem 1806, uplink antenna subsystem 1808, and downlink antenna subsystem 1810, in an embodiment. Power subsystem 1804 may include one or more solar cell assemblies (including one or more solar panels attached to an outer structure, such as the outer load path support structure), and one or more batteries, for example.

Uplink antenna subsystem 1808 may receive uplink signals (e.g., uplink television signals) transmitted from an uplink hub (e.g., hub 104, FIG. 1). In an embodiment, uplink signals include uplink television signals, which may include multiple channels of content (e.g., audio and video) that are multiplexed or otherwise combined together. Uplink signals may include other types of information, in addition or alternatively. In an embodiment, an uplink receive antenna may include a circularly-polarized or a linearly-polarized antenna. In either case, dual (orthogonal) polarizations may be used in order to make full use of the allocated spectrum.

Communications subsystem 1806 may channelize and amplify uplink communication signals, downconvert the channels to the transmit frequency band, and amplifies the signals for transmission at the appropriate power level to the ground, in an embodiment. Final stage amplifiers may include an active traveling wave tube for each RF channel. Final stage amplifiers may include solid state power amplifiers, in other embodiments. In an embodiment, twelve channels for each polarization may be multiplexed together to provide the inputs to the downlink antenna.

In addition, communications subsystem 1806 may receive uplink control signals regarding operation of the propulsion/orbit maintenance/attitude control subsystems 1802 and the communications subsystem 1806, among other things, in an embodiment. In response to the uplink control signals, communications subsystem 1806 may be used to activate the transmitters and/or receivers during an active orbit segment as an alternative to an autonomous on-board system for achieving this function. In addition, communications subsystem 1806 may send information to propulsion/orbit maintenance/attitude control subsystems 1802 regarding firing sequences for propulsion subsystem elements. In an embodiment, communications subsystem 1806 may transmit appropriate information (e.g., health/status and telemetry information) to a control station, which may be used in managing the operation of the satellite.

Downlink antenna subsystem 1810 transmits communication channels to the ground (e.g., 24 communication channels) with a directional pattern that contains all of the user equipment systems. In an embodiment, the antenna beam is pointed in the appropriate direction using a despin control system and a mechanism that rotates the antenna in elevation. Other embodiments may include an additional mechanism to rotate the antenna about the boresight. In an embodiment, downlink antenna subsystem 1810 includes a downlink antenna adapted to produce an antenna pattern that is a figure of revolution.

Propulsion/orbit maintenance/attitude control subsystems 1802 may be adapted to provide velocity increments for orbit changes, maintain satellite 1800 in the satellite's orbit, and make satellite attitude adjustments, in an embodiment. Although propulsion, orbit maintenance, and attitude control may be performed by distinct subsystems, in an embodiment, they may share some common system elements (e.g., thrusters 1504-1515, FIG. 15). Accordingly, for purposes of explanation, they are illustrated in a single block in FIG. 18. Alternatively, they may be referred to separately as a propulsion subsystem, an orbit maintenance subsystem, and an attitude control subsystem.

In order to provide orbit maintenance and/or attitude control, propulsion/orbit maintenance/attitude control subsystems 1802 may calculate and/or receive attitude and/or orbit adjustment information, and may operate one or more propulsion subsystem elements in order to adjust the satellite's attitude and/or orbit. In a particular embodiment, propulsion/orbit maintenance/attitude control subsystems 1802 are adapted to maintain satellite 1800 in a highly elliptical orbit (e.g., a Molniya orbit) with an orbital period of about 12 hours and an angle of inclination of about 63.4 degrees, while countering the perturbing gravitational influences of the earth, sun, and moon. As discussed previously, satellite 1800 may be maintained in other NGSO and/or GSO orbits, in other embodiments. Maintaining the orbit may also include maintaining equal nodal separations between the satellites and other satellites within a satellite fleet (e.g., nodal separation of about 60 degrees for a fleet of six satellites). In a particular embodiment, propulsion/orbit maintenance/attitude control subsystems 1802 may be adapted to maintain an orbit phasing of the satellite, with respect to other satellites within the satellite fleet, so that the satellite enters an active orbit segment and initiates transmission of downlink signals as a second satellite exits an active orbit segment and ceases transmission of the downlink signals. In an embodiment, orbital phasing may be adjusted to permit uninterrupted transmissions while the satellite is within an active orbit segment. In addition, propulsion/orbit maintenance/attitude control subsystems 1802 may be adapted to maintain the attitude of satellite 1800.

As discussed previously, satellite 1800 may be maintained in an ecliptic normal attitude, in an embodiment. In a particular embodiment, propulsion/orbit maintenance/attitude control subsystems 1802 may be adapted to maintain satellite 1800 in an ecliptic normal attitude so that the satellite's outer structure (e.g., substantially cylindrical outer load path support structure 1002, FIG. 10) and the solar array panels are approximately perpendicular to the sun throughout the year. In an embodiment, the payload (e.g., power subsystem 1804, communications subsystem 1806, uplink antenna subsystem 1808, and downlink antenna subsystem 1810) are substantially surrounded by the outer structure, which may result in a thermal boundary that is approximately constant throughout each orbit and throughout the operational life of satellite 1800. One or more fuel sources may be associated with propulsion/orbit maintenance/attitude control subsystems 1802, which may be drawn upon by the various propulsion elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for implementing a satellite fleet, wherein the satellite fleet includes multiple-satellites whose orbital planes have separated nodes, the method comprising:
    launching a first launch vehicle, which contains a first group of the multiple satellites within a first payload fairing of the first launch vehicle;
    releasing the first group from the first payload fairing into an initial orbit;
    performing a first series of one or more orbit changes to transition a first satellite of the first group from the initial orbit to an a first operational orbit having a first operational orbit apogee altitude that is higher than an initial orbit apogee altitude;
    performing a second series of one or more orbit changes to transition a second satellite of the first group from the initial orbit to the a second operational orbit, wherein performing the second series includes establishing a first desired nodal separation between the first satellite and the second satellite by allowing the second satellite to drift for one or more first drift time periods at one or more orbits having apogee altitudes below a second operational orbit apogee altitude;
    placing into operation, proximate to the Earth within a coverage area of a plurality of aimed beams from the first group, an uplink hub transmitting uplink television signals toward the first satellite and the second satellite and a plurality of direct television antennas configured to receive a plurality of downlink television signals from the first group; and
    broadcasting, by the plurality of aimed beams from the first group, the plurality of downlink television signals to the plurality of direct television antennas in response to receiving the plurality of uplink television signals.

2. The method of claim 1, further comprising:
    when the first group includes at least one additional satellite, performing at least one additional series of one or more orbit changes to transition the at least one additional satellite from the initial orbit to a third operational orbit, until each of the multiple satellites of the first group have been transitioned into a corresponding operational orbit.

3. The method of claim 1, further comprising:
    prior to launching, stacking the satellites of the first group in the first payload fairing to form a satellite stack, wherein the satellites are stacked so that an outer load path support structure of a lower satellite of the satellite stack bears the load of any higher satellites of the satellite stack.

4. The method of claim 1, wherein:
    performing the first series of one or more orbit changes includes firing a booster rocket of the satellite to perform each of the one or more orbit changes.

5. The method of claim 1, further comprising:
    imparting an axial rotation to the first group at the initial orbit.

6. The method of claim 1, wherein the first desired nodal separation is in a range of about 10 degrees to about 180 degrees.

7. The method of claim 1, wherein performing the first series of orbit changes comprises:
    performing at least some of the orbit changes when the first satellite is in a vicinity of perigee.

8. The method of claim 1, further comprising:
    after performing the first series of one or more orbit changes, preparing for system operations by de-spinning a communications payload subsystem of the first satellite.

9. The method of claim 1, further comprising:
    after performing the first series of one or more orbit changes, preparing for system operations by adjusting an attitude of the first satellite to place the first satellite in an ecliptic normal attitude.

10. The method of claim 9, wherein preparing for the system operations further comprises:
    orienting an antenna assembly of the first satellite in a direction to support downlink signal transmission into a desired coverage area using at least two control axes, wherein a first control axis is a primary axis, and wherein a second control axis is an elevation adjustment axis that is substantially orthogonal to the primary axis.

11. The method of claim 10, wherein orienting the antenna assembly comprises:
    orienting the antenna assembly with respect to the primary axis using a despin control mechanism adapted to provide a 360 degree range adjustment around the primary axis, orienting the antenna assembly with respect to the elevation adjustment axis using an elevation adjustment mechanism adapted to provide about a 90 degree range adjustment around the elevation adjustment axis.

12. The method of claim 1, further comprising:
    after performing the first series of one or more orbit changes, actively performing satellite orbit maintenance to correct for orbital deviations using a plurality of axial thrusters, radial thrusters, and canted thrusters.

13. The method of claim 1, further comprising:
    after performing the first series of one or more orbit changes, actively performing satellite orbit maintenance to maintain the first satellite in a Molniya orbit with an orbital period of about 12 hours, an angle of inclination of about 63.4 degrees, and a desired nodal separation of the first satellite, with respect to other satellites within the satellite fleet, of 360 degrees divided by a total number of satellites in the satellite fleet.

14. The method of claim 1, further comprising:
    launching a second launch vehicle, which contains a second group of the multiple satellites within a second payload fairing of the second launch vehicle;
    releasing the second group from the second payload fairing into the initial orbit;
    sequentially transitioning each satellite of the second group of satellites to a second plurality of operational orbits so that desired nodal separations are established between satellites of the first group and satellites of the second group and so that each of the second plurality of operational orbits has the same ground path as the first plurality of orbits.

15. The method of claim 1 further comprising:

receiving, by each of the plurality of direct television antennas, the plurality of downlink signals transmitted by the first satellite in the first operational orbit and the second satellite in the second operational orbit.

16. The method of claim 1 further comprising:

wherein each of the plurality of direct television antennas do not include a tracking mechanism configured to dynamically point toward and track a satellite from which each antenna is receiving the plurality of downlink television signals.

17. The method of claim 1 further comprising:

configuring the first operational orbit and the second operational orbit to track along a substantially fixed path on the surface of the Earth over which each satellite in the first group travels during its orbit.

18. The method of claim 1 further comprising:

configuring the first operational orbit and the second operational orbit to be phased so that the second satellite enters an active orbit segment of the second satellite and initiates a transmission of a plurality of downlink signals as the first satellite exits an active orbit segment of the first satellite and ceases the transmission of the plurality of downlink signals, wherein the active orbit segment is centered about an apogee and has a duration of a sidereal day divided by a total number of satellites in the plurality of satellites.

19. The method of claim 1 further comprising:

wherein each satellite in the first group receives, at a feed horn in the antenna assembly, the plurality of uplink television signals; and wherein the feed horn produces the plurality of downlink television signals, and projects the plurality of downlink television signals toward a reflector in the antenna assembly which reflect the downlink signals in a beam direction determined by a position of the antenna assembly.

* * * * *